United States Patent [19]

Krishnan et al.

[11] Patent Number: 5,492,550
[45] Date of Patent: Feb. 20, 1996

[54] SURFACE TREATING ARTICLES AND METHODS OF MAKING SAME

[75] Inventors: Subramanian Krishnan, St. Paul; Eugene J. Miller, Maplewood; Mary B. Donovan, St. Paul; Ramona M. Janochoski, Lake Elmo, all of Minn.; Caroline Couvelard, Vauhallan, France

[73] Assignee: Minnesota Mining and Manufacturing Company, St. Paul, Minn.

[21] Appl. No.: 184,507

[22] Filed: Jan. 19, 1994

Related U.S. Application Data

[63] Continuation-in-part of Ser. No. 60,616, May 12, 1993, Pat. No. 5,306,319.

[51] Int. Cl.$^6$ ................................................ C09K 3/14
[52] U.S. Cl. ........................... 51/298; 51/294; 51/295; 428/395
[58] Field of Search ......................... 51/294, 295, 298; 428/395; 524/732; 528/64

[56] References Cited

U.S. PATENT DOCUMENTS

| | | | |
|---|---|---|---|
| 2,885,276 | 7/1957 | Upton, Jr. | 51/298 |
| 2,958,593 | 11/1960 | Hoover et al. | 51/295 |
| 3,971,745 | 7/1976 | Carlson et al. | 260/29 |
| 4,036,906 | 7/1977 | Finelli | 260/830 |
| 4,160,065 | 7/1979 | Loewrigkeit et al. | 428/425 |
| 4,190,567 | 2/1980 | Ohmura et al. | 260/29 |
| 4,227,350 | 10/1980 | Fitzer | 51/295 |
| 4,306,998 | 12/1981 | Wenzel et al. | 260/13 |
| 4,403,805 | 9/1983 | Christensen et al. | 528/45 |
| 4,522,851 | 6/1985 | Rosthauser | 427/386 |
| 4,786,657 | 11/1988 | Hammar et al. | 522/90 |
| 4,826,894 | 5/1989 | Markusch et al. | 523/415 |
| 4,835,210 | 5/1989 | Chin et al. | 524/732 |
| 5,290,903 | 3/1994 | Hsu et al. | 528/53 |
| 5,306,319 | 4/1994 | Krishnam et al. | 51/298 |

FOREIGN PATENT DOCUMENTS

| | | | |
|---|---|---|---|
| 0292750A1 | 5/1988 | European Pat. Off. | C09D 3/72 |
| 8219213 | 12/1983 | Japan . | |
| 3006929 | 1/1991 | Japan . | |
| 5295076 | 11/1993 | Japan . | |
| 2021625 | 5/1979 | United Kingdom | C09K 3/14 |

OTHER PUBLICATIONS

Scotch–Brite™ High Resolution Printed Circuit Cleaning Brushes and Flap Brushes No Date.
Scotch–Brite™ Surface Conditioning Belts 1991.
3M Wheels, published Dec. 1990.
3M Products for Bench Area Operations, published Dec. 1989.

*Primary Examiner*—Deborah Jones
*Attorney, Agent, or Firm*—Gary L. Griswold; Walter N. Kirn; Daniel R. Pastirik

[57] ABSTRACT

Surface treating articles having varying degree of smear-resistance and their methods of manufacture are presented. One preferred article is characterized by an organic matrix substantially engulfed by a novel, tough, adherent elastomeric resinous binder system comprising a reaction product of either selected from (1) a polyurethane prepolymer with an amine curative, (2) a polyurethane prepolymer emulsion with an epoxy-functional material and an amine functional material, and (3) a polyurethane polymer emulsion with an epoxy-functional material and an amine-functional material in an aqueous system.

35 Claims, 1 Drawing Sheet

SURFACE TREATING ARTICLES AND METHODS OF MAKING SAME

CROSS-REFERENCE TO RELATED APPLICATIONS

This application is a continuation-in-part of application Ser. No. 08/060,616, filed May 12, 1993, U.S. Pat. No. 5,306,319.

BACKGROUND OF THE INVENTION

1. Brief Description of the Invention

The present invention relates to surface treating articles formed from an organic matrix at least partially coated with or engulfed by an organic binder. The articles may be substantially rigid or flexible, depending on the binder glass transition temperature.

2. Related Art

Surface treating articles formed from an organic polymeric matrix formed of a solid or foamed organic polymer or a nonwoven fiber web find utility in treating a surface to either prepare it for further coatings or to provide a decorative final finish. Burrs and flashings from cast, drilled or punched parts must be removed to produce a desired shape or surface finish. Surface treating articles in the form of wheels, discs, or belts operating at high speeds and high pressures must have sufficient strength and durability when subjected to high use pressure against the workpiece. In some instances, it may be desirous for the article to be flexible to intrude into crevices in the workpiece, in other instances, it may be desirous for the article to be rigid. In addition, the propensity of the article to smear onto the workpiece must be taken into consideration. Smearing is generally considered deleterious.

Polymeric resinous binders used to bond the matrix or to secure abrasive particles within the matrix of such products have generally been either of the hard thermosetting type or the strong, tough elastomeric type. Hard thermosetting resins, such as base catalyzed phenol formaldehyde, are widely used to secure abrasive particles to sheet-like backings or to the fibers of a nonwoven web. Such hard resin binders, while usually having high tensile strength, low elongation at break or failure, and resistance to significant change when subjected to elevated temperatures, are undesirably susceptible to brittle fracture. Strong, tough elastomeric resin binders are more desirable in certain applications which require tougher, more durable surface treatment products. Such elastomeric binders have excellent tensile strength, a high elongation at break, and resistance to brittle fracture but may exhibit significant softening at elevated temperatures as might be encountered when the surface treatment article is urged against a workpiece at high speeds and pressures. Such softening may result in smearing or transfer of portions of the article to the surface of the workpiece, which as described previously is not desired by the user.

The surface treating industry is continually striving for articles which more closely meet user demands. In addition, methods of producing surface treating articles that are kind to the environment, particularly the air and water, are especially strived for.

In light of the above user-driven demands it would be advantageous if surface treating articles could be developed which, by virtue of simple adjustment of binder ingredients, can be tailored to be flexible or rigid, substantially non-smearing at use pressure and temperature, all while using manufacturing processes which do not require use and subsequent removal of volatile organic hydrocarbons.

Chin et al. (U.S. Pat. No. 4,835,210) discloses a process of making an emulsion of a blocked urethane prepolymer and a diamine curative in water. Hoover et al. (U.S. Pat. No. 2,958,593) discloses use of vulcanizates made from reactive precursors dissolved in an organic solvent for making abrasive articles in a lofty organic matrix. Fitzer (U.S. Pat. No. 4,227,350) discloses an abrasive product which employs a tough elastomeric resin binder having excellent tensile strength, a very high elongation at break, and resistance to brittle fracture, but which show significant softening at elevated temperatures. Barnett et al. (U.S. Pat. No. 4,609,380) further advances Hoover et al. and Fitzer with the use of blocked isocyanate end-capped urethane prepolymers and an aromatic diamine in an organic solvent as the prevulcanizate and the addition of specific high glass transition, organic solvent soluble polymers to the vulcanizate precursors to make abrasive articles that cause low smear in high speed grinding or finishing operations. All of the additives that Barnett et al. suggest are insoluble in water. Further, Barnett et al. specifically mention "solvent soluble" (i.e. organic liquid soluble) as a criterion for the selection of the desired high glass transition polymeric additive to make smear-free abrasive articles. Therefore facile or immediate adaptation of the teachings of Barnett et al. for the fabrication of abrasive articles using a substantially aqueous medium for the vulcanizate precursors, such as in Chin et al. will not be immediately feasible.

SUMMARY OF THE INVENTION

The present invention is a further advance over the Chin et al. compositions such that they may be suitable for binding randomly air-laid organic staple fibers such that a porous and lofty web is produced. This web is used to develop nonwoven abrasive articles that are useful in grinding, finishing or polishing procedures. Also disclosed is a procedure whereby inherently water insoluble, smear-reducing additives described by Barnett et al. can be temporarily dissolved in an organic solvent and mixed with emulsifiable blocked isocyanate end capped linear polyurethane prepolymer and a diamine curative by use of an emulsifier. The organic solvent and emulsifier combination is used to carry the organic solvent soluble smear- reducing additives into homogeneity with the prepolymer and curative.

The present invention further discloses that smear-reducing property can also be incorporated into the binder without the need for the accommodation of organic solvent soluble high $T_g$ additives or the attendant necessity to use organic solvent as a carrier during the pre-emulsification homogenization step, by creating a high glass transition for the cured vulcanizates by the in situ generation of an epoxy-amine adduct that further reacts with the aforementioned emulsifiable blocked isocyanate end capped linear urethane prepolymer.

In accordance with the present invention, surface treating articles are presented which can be urged against a workpiece at high pressure and/or high speed with little or no undesirable smearing or other transfer of the article to the workpiece surface.

As used herein the term "smear-resistant" is meant to denote embodiments of the invention exhibiting substantially no visible signs of the surface treatment article remaining on the workpiece after the workpiece has been treated.

In these embodiments, the articles of the invention can be urged against a workpiece at high operating speeds and/or pressures without smearing of the article onto the workpiece. The term "surface treating" is used generally to include grinding, lapping, polishing, finishing, deburring and the like.

Thus, a first aspect of the invention is a surface treating article comprising an organic matrix substantially engulfed by a binder, the binder comprising materials selected from the group consisting of:
- a) a reaction product derived from an aqueous binder precursor emulsion comprising a plurality of blocked linear isocyanate-terminated polyurethane prepolymers and an amine-functional material having an average amine functionality of at least 2, the emulsion further including an ingredient selected from the group consisting of
  - i) a sufficient amount of a thickening agent; and
  - ii) a combination of a compatible smear-reducing additive, an organic solvent, and a surfactant;
- b) the reaction product of a plurality of linear isocyanate-terminated polyurethane prepolymers with a first adduct, the first adduct comprising the reaction product of an amine-functional material having an average amine functionality of at least 2 and an epoxy-functional material having an average epoxy functionality of at least 2, with the provisos that the first adduct has at least one amine reactive with isocyanates and at least one secondary hydroxyl moiety reactive with isocyanates; and
- c) the reaction product of a plurality of linear polyurethane polymers having a high molecular weight, said polymers having a plurality of ionic moieties, with a second adduct, the second adduct selected from the group consisting of
  - i) the reaction product of the amine-functional material and an epoxy-functional material of part b) above, and
  - ii) the reaction product of the amine-functional material and a homopolymerized epoxy-functional material, with the provisos that the second adduct has at least one epoxy functional group reactive with the ionic moieties, and preferably at least one amine functional group reactive with the ionic moieties.

As used herein the term "substantially engulfed" means that the there is porosity in the surface treating articles of this aspect of the invention to afford a void volume percentage ranging from about 25% to about 95% based on total volume of the article. Articles within this aspect of the invention have density ranging from about 1.0 to about 2.0 grams/cm$^3$.

Articles within this aspect of the invention which are devoid of abrasive particles may be used for polishing metals and the like. If the surface treatment articles in accordance with this aspect of the invention include a plurality of abrasive particles dispersed and adhered within the binder, the article may be useful as a deburring article.

In reaction product a), the binder is derived from an aqueous binder precursor emulsion which includes an ingredient, such as methylcellulose, which allows the precursor composition to be applied to an open, porous web. It was found that direct application with a roll coater of aqueous emulsions devoid of sufficient thickening agent, such as disclosed in U.S. Pat. No. 4,835,210, would not produce acceptable finished products since the fibers in an air-laid web were too easily extracted from the web by the roll coater, and contamination of the coating liquid with fibers. A "sufficient amount" of thickening agent would be that amount necessary to provide a viscosity of the binder precursor emulsion of at least 2000 mPa, measured using a Brookfield viscometer at 30 rpm, at 20° C., using a number LV-3 spindle. Use of the binder precursor emulsion a) also allows water insoluble, organic solvent soluble smear-reducing additives to be utilized when the emulsion also contains a surfactant, such as lithium stearate.

In reaction products b) and c), a polymeric curative is produced in situ. The inventive binders provide the articles of the invention a wide available range of flexibility and smear-resistance, thus making them useful in articles designed to aggressively abrade a workpiece, deburr or finish a workpiece, wipe the surface of a workpiece, or buff or polish a workpiece. In addition, the inventive binder may be, and preferably is, applied to the organic matrix in the form of an aqueous composition, thus eliminating or substantially reducing the release of volatile organic compounds in the process of making the inventive articles.

A second aspect of the invention is a surface treating article, preferably in the form of an endless belt, comprising an open, lofty, three-dimensional nonwoven web comprised of a plurality of organic polymeric fibers bound together at points where they contact the inventive binder. Preferred articles within this aspect of the invention comprise a plurality of abrasive particles adhered to the fibers and binder by a second binder, typically and preferably a thermoset binder. A particularly preferred article within this aspect of the invention is one which includes a third binder comprising an inventive binder.

A third aspect of the invention is a method of making a layered composite from which a surface treating article suitable for use in polishing and/or deburring metal, wood, and the like, may be machined, the method comprising:
- a) forming an open, lofty, three-dimensional nonwoven web comprised of organic fibers;
- b) coating a major portion of the fibers of the nonwoven web with a prebond precursor composition to form a first coated web;
- c) exposing the first coated web to energy sufficient to at least partially cure the prebond precursor composition to form an open, lofty, three-dimensional nonwoven prebonded web of fibers;
- d) coating at least a portion of the fibers of the prebonded web with an aqueous slurry comprising water, abrasive particles and a binder to form a second coated web, the binder comprising an inventive binder;
- e) exposing the second coated web to energy sufficient to remove substantially all of the water, thereby forming a substantially dried web;
- f) juxtaposing a plurality of substantially dried webs to form a precursor layered composite; and
- g) compressing the precursor layered composite with pressure and at a temperature sufficient to form the layered composite.

Preferred are those methods wherein the layered composite is machined into the form of a surface treating article, such as a disc, wheel, rectangular block, and the like. Also preferred are those methods wherein the prebond precursor comprises the inventive binder.

A fourth aspect of the invention is a method of making a surface treatment article suitable for use as a polishing article, the method comprising:
- a) forming an open, lofty, three-dimensional nonwoven web comprised substantially of hydrophilic organic fibers;
- b) coating a major portion of the fibers of the nonwoven web employing an effective pressure with an aqueous composition comprising water and a binder to form a coated web, the binder comprising an inventive binder;

c) juxtaposing a plurality of said coated webs to form a precursor layered composite; and d) compressing the precursor layered composite with pressure and at a temperature sufficient to form the layered composite.

A fifth aspect of the invention is a method of making an open, lofty nonwoven abrasive article, the method comprising:

a) forming an open, lofty, three-dimensional nonwoven web of organic fibers;

b) entangling the organic fibers of the nonwoven web to form an entangled web having an effective density;

c) coating the entangled web with an aqueous composition comprising water and a binder to form a first coated web, the binder comprising an inventive binder;

d) exposing the first coated web to energy sufficient to substantially remove the water, thus forming a dried, coated, entangled web;

e) coating the dried, coated, entangled web with a slurry comprising abrasive particles and a binder precursor to form a slurry coated web; and f) exposing the slurry coated web to energy sufficient to substantially cure the binder precursor, thus forming a nonwoven surface treating article.

A preferred method in accordance with this aspect of the invention is one wherein the surface treating article has first and second ends which are spliced together to form an endless belt. As used herein, the term "effective density" means a density low enough to allow the resulting article to pass swarf therethrough, but high enough to afford the article high tensile strength in cross- and machine- directions.

A sixth aspect of the invention is an aqueous composition comprising an inventive binder.

Surface treatment articles of the invention are especially effective in abrading metals without substantial smearing onto the metal workpiece. When reaction product b) is employed, the amine/epoxy reaction stoichiometry may be adjusted to produce a distribution of molecules where all epoxy groups have reacted but containing less than the requisite amount of amine equivalents for the isocyanate groups to react with. This produces a relatively rigid article, having a high thermal stability (high glass transition temperature, about 33° C. or greater as measured by differential scanning calorimetry, or "DSC"). When, in comparison, an article made in accordance with U.S. Pat. No. 4,609,380 (Barnett et al.) is rotated against a workpiece under heat-generating conditions such as high wheel to workpiece pressure and surface speed, these conditions may cause surface portions of the wheel to smear, or transfer onto the surface of the workpiece.

An important aspect of the invention is that articles of the invention may employ inventive binders which allow the articles to exhibit a high flex fatigue resistance (in other words, able to deform and penetrate into grooves and indentations in a metal workpiece, and then return to its original shape, in a cyclic process). Articles of this nature have an intermediate glass transition temperature (ranging from about 28° to about 33° C.), and may be produced by adjusting the stoichiometry of the amine/epoxy reaction so that the amine/epoxy reaction leaves a distribution of molecules containing an equivalent number of amine end groups for the isocyanate groups to react with. This stoichiometry produces a crosslinked structure which is primarily due to the reaction of amine groups with epoxy groups.

Finally, articles of the invention may be formulated to be highly flexible which smear substantially at high use pressures and/or high surface speeds, but which are substantially non-smearing when used at lower pressures and/or surface speeds. To achieve this, the amine/epoxy reaction is formulated to leave a distribution of molecules containing greater than the requisite amount of amine equivalents needed to completely react with the unblocked isocyanate groups. In this instance, the polyurea reaction product formed will have a much lower average molecular weight than that formed in the non-smearing binder mentioned above, resulting in lower thermal stability (glass transition temperature of 28° C. or less).

As previously indicated, some embodiments of the articles of the invention may be sufficiently aggressive to perform the desired abrading operation without the need of abrasive particles. However, many applications such as deburring of steel parts or the application of a matte finish to stainless steel will require the addition of abrasive particles.

Preferred articles within the invention may also include in the binder efficacious amounts of functional additives such as, for example, fillers, reinforcements, colorants, plasticizers, grinding aids, and/or conventional lubricants (of the type typically used in surface treating articles) to further adjust the amount of smearing.

Further aspects and advantages of the invention will become apparent from the drawing figures and description of preferred embodiments which follows.

Figure 1:
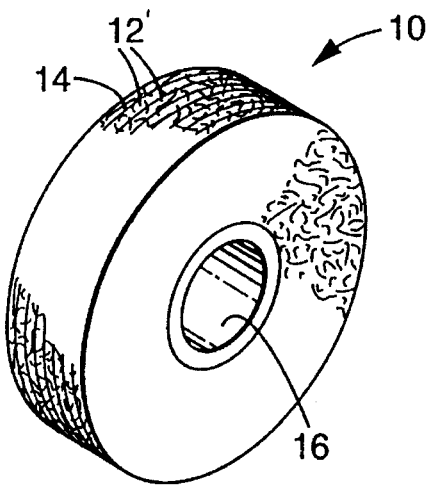
FIG. 1 is a perspective schematic view of a polishing wheel of the invention with no abrasive particles in the binder, which engulfs an organic matrix.

DESCRIPTION OF PREFERRED EMBODIMENTS
INVENTIVE BINDERS

1. Prepolymer/Adduct Reaction Product

As previously stated, the inventive binder comprises materials selected from the group consisting of: a) the reaction product of a plurality of linear isocyanate-terminated polyurethane prepolymers with an amine-functional material having an average amine functionality of at least 2; b) the reaction product of a plurality of linear isocyanate-terminated polyurethane prepolymers with a first adduct (herein after referred to as the "prepolymer/adduct reaction product"), and c) the reaction product of a plurality of linear polyurethane polymers having a high molecular weight, the polymers having a plurality of ionic moieties, with a second adduct (herein after referred to as the "ionic polymer/adduct reaction product").

When the inventive binder comprises the polyurethane prepolymer/adduct reaction product, the polyurethane prepolymer provides flexibility and resilience to the inventive binder when cured.

The first adduct functions to provide crosslinking sites (typically and preferably secondary hydroxyl moieties) with which isocyanates of the polyurethane prepolymer may react. The first adduct comprises the reaction product of an amine-functional material having an average amine functionality of at least 2 and an epoxy-functional material having an average epoxy functionality of at least 2. As used herein the term "epoxy-functional" is not meant to be limited to oxirane-containing materials, but may include oxetane-containing materials, provided their rate of reaction with amine functional groups is acceptable. The term "amine-functional" is meant to include primary and secondary amines.

In producing the first adduct in situ in accordance with Reaction 1 discussed below, the first adduct has at least one amine (preferably at least one primary amine) reactive with isocyanates and at least one secondary hydroxyl moiety reactive with isocyanates.

When the inventive binder comprises the polyurethane prepolymer/adduct reaction product, the inventive binder is preferably derived from an aqueous emulsion, the binder produced from an emulsion of a ketoxime-blocked polyurethane prepolymer reacted with an adduct formed in situ. Examples of useful ketoxime-blocked polyurethane prepolymers are those prepared using the methods described by Chin et al., U.S. Pat. No. 4,835,210, Examples 1–3, incorporated by reference herein (see reaction 1, below); "BAY-BOND-116", a reaction product of a ketoxime-blocked hexamethylenediisocyanate and a polyol, commercially available from Miles, Inc., Pittsburgh, Pa.; and other isocyanate-terminated prepolymers that may be reacted with methylethyl ketoxime in an unreactive organic solvent such as N-methylpyrrolidone. When this form of polyurethane prepolymer is employed, the adduct is preferably formed from the reaction product of an emulsified epoxy resin and an amine-functional epoxy curative (the amine-functional material). If the polyurethane prepolymer known under the trade designation "Adiprene L-167" having "m" repeating butoxy units, wherein "m" ranges from 20 to about 50, if "m" is above about 50, a waxy binder may be formed having too low of a glass transition temperature, while if "m" is below 20, a more rigid article results.

The epoxy-functional material provides a means for adjusting the hardness of the inventive binder when cured. The epoxy-functional material preferably comprises materials selected from the group consisting of diepoxy-functional materials within the general formula

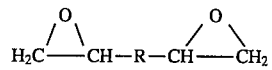

wherein R may be any organic radical with the proviso that the organic radical does not hinder the ability of the material to be emulsified. Preferred are those diepoxy-functional materials wherein R is selected from the group consisting of

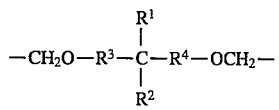

wherein $R^1$ and $R^2$ are independently selected from the group consisting of alkyl groups having from 1 to about 10 carbon atoms, and $R^3$ and $R^4$ are independently selected from the group consisting of aryl and alkaryl radicals having from 6 to about 20 carbon atoms. In the latter materials, it is to be understood that $R^3$ and $R^4$ if aryl may be alkyl-substituted. An example of a useful epoxy-functional material of this type is the aqueous dispersion known under the trade designation "EPI-REZ CMD-35201", commercially available from Shell Chemicals, Inc., Houston, Tex., wherein $R^1$ and $R^2$ are methyl, and $R^3$ and $R^4$ are unsubstituted phenyl moieties.

Another class of epoxy-functional materials suitable for use in producing the inventive binders are those wherein the epoxy-functional material comprises a novolac-type epoxy resin within the general formula

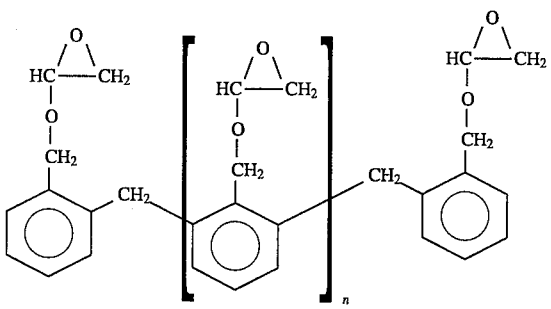

wherein n may range from 1 to about 10. A novolac-type epoxy resin water emulsion is available from Ciba-Geigy Corporation, Hawthorne, N.Y. under the trade designation "MS 9772".

The amine-functional material provides a means for crosslinking of the inventive binder in accordance with the polyurethane prepolymer/adduct reaction product during curing and must be reactive with the epoxy-functional material. Especially useful amine-functional materials are also reactive with the polyurethane prepolymer after reacting with the epoxy-functional material, such as by having secondary amine or primary hydroxyl functionalities.

Examples of useful amine-functional materials are alicyclic diamines such as isophorone diamine, commercially available from Hüls America, Inc. and 4,4'-diaminodicyclohexylmethane, available as the major component in a composition known under the trade designation "PACM-20" from Air Products and Chemicals, Inc., Allentown, Pa.; aliphatic diamines such as amino-functional poly(oxyalkylene) compounds available under the trade designation "JEFFAMINE" from Texaco, Inc., Houston, Tex.; and aromatic diamines such as methylenedianiline and diethyltoluenediamine. Generally, the amine-functional material reactivity in producing the inventive binder is aliphatic>alicyclic>aromatic. Due to the high reactivity of aliphatic diamines, alicyclic, aromatic, and mixed alicyclic and aromatic diamines are preferred.

Poly(oxyalkylene) compounds such as poly(oxyalkylene) amines (POAA) and poly(oxyalkylene) ureides having molecular weight ranging from about 90 to about 1000 are useful amine-functional materials. The poly(oxyalkylene) compounds useful in the invention may or may not have terminal amine functionality.

Useful poly(oxyalkylene) amines which are diamines are selected from the group consisting of compounds represented by general formulas I, II, III, and IV:

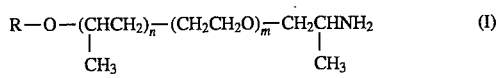

wherein R is an alkyl group having from 1 to 4 carbon atoms and n and m are integers ranging from 0 to 20;

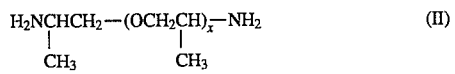

wherein x is an integer ranging from about 2 to about 10 diamines selected from the group consisting of

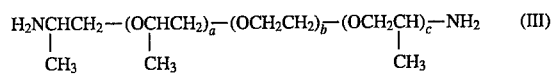

wherein a, b, and c are integers, the sum of a plus c ranges from 1 to 5, and b ranges from 0 to 20; and poly(oxyalkylene) amines which are triamines selected from the group consisting of compounds represented by the general formula

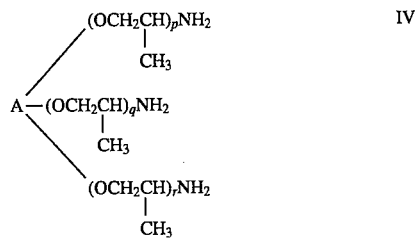

wherein p, q, and r are integers greater than zero such that the sum of p, q, and r ranges from about 5 to about 30, and wherein A is a triol initiator, such as trimethylolpropane, glycerine, or the like.

Representative examples of poly(oxyethylene) amines which are useful in the practice of the invention include: poly(oxypropylene) diamine, poly(oxyethylene-co-oxypropylene) diamine, poly(oxyethylene-co-oxypropylene) urea, poly(oxyethylene-co-oxypropylene) diurea, and the trifunctional reaction products of glycerine or trimethylolpropane with hydroxy-terminated poly(oxypropylene) amine.

While not being bound to any particular theory, it is currently believed that, when the three components of the inventive binder of the polyurethane prepolymer/adduct reaction product are combined, the more reactive functionality of the amine-functional material initially reacts with epoxide groups of the epoxy-functional material to form an epoxy/amine adduct (Reaction 1). When aqueous emulsions are employed, water evaporates upon heating followed by cleavage of the ketoxime blocking group from the polyurethane prepolymer to allow the now free isocyanate groups to react with the available amine groups of the epoxy/amine adduct (Reaction 2). While the secondary hydroxyl groups of the adduct are also available for reaction with the unblocked isocyanate groups of the polyurethane prepolymer, the overall relative reactivities are considered to be primary amine>secondary amine>>>secondary hydroxyl. Upon completion of this reaction, the inventive binder made by the polyurethane prepolymer/adduct reaction is considered completely cured.

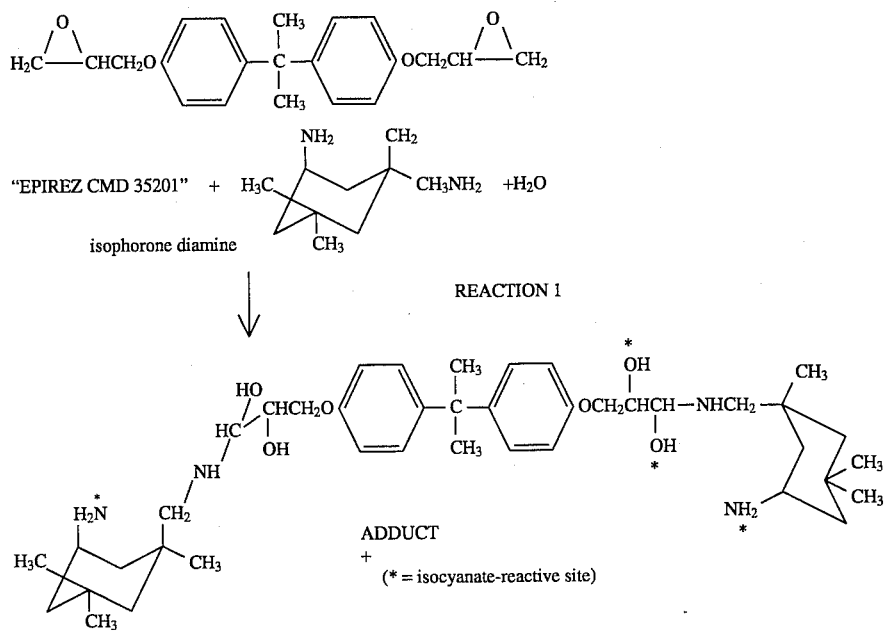

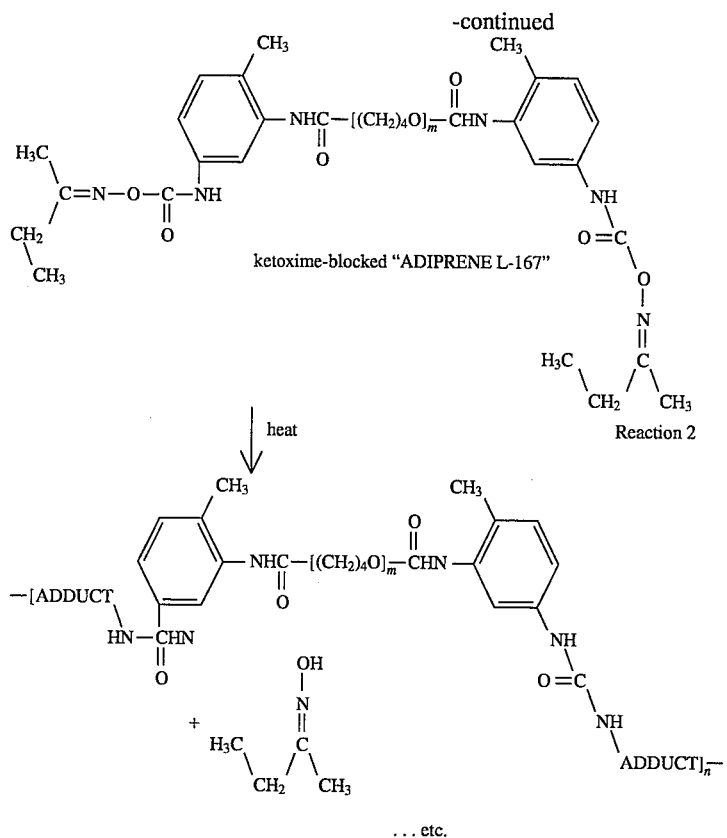

As previously stated, the equivalents of amine, epoxy, and isocyanate may be adjusted to vary the glass transition temperature of the inventive binder made by the polyurethane prepolymer/adduct method. For example, the equivalent weight of isophorone diamine for reaction with epoxy group is 42.5 grams/eq. and for reaction with isocyanate group is 85 grams/eq. In a system where epoxy resin, a diamine and a blocked diisocyanate polyurethane prepolymer are mixed, the amount of diamine can be adjusted such that one of the following three states exists:

1. There is adequate equivalents of the amine present to react with both the epoxy and the isocyanate present in the mixture;
2. There is less than adequate amount of amine present to react with both the epoxy and the isocyanate present; and
3. There is more than adequate amount of amine present to react with both the epoxy and the isocyanates present.
4. The fourth state is where there is no epoxy resin.

In the absence of an epoxy resin (state "4") a substoichiometric (i.e. from about 5 to about 15% less than stoichiometric, more preferably about 8 to about 10% less) amount of amine with respect to blocked isocyanate is employed such that:

(i) crosslinking occurs to toughen the binder by the reaction of chain end isocyanate moieties with the urea nitrogen; and (ii) chain extension occurs by the generation of amine moieties when isocyanate reacts with adventitious moisture invariably present when emulsions are cured under ambient conditions with the supply of heat. Both events (i) and (ii) provide for greater thermal stability.

As seen in Examples 1–6 below, and explained previously, in state 2 (Examples 1 and 3) the amine/epoxy reaction leaves a distribution of molecules where all epoxy groups have reacted but contain less than the requisite amount of amine equivalents for the isocyanate groups to react with. In this case, the excess isocyanate groups react with secondary hydroxyl groups generated in the ring opening epoxy reaction thus contributing to a greater amount of crosslinking. The resulting inventive binder is less flexible but thermally more stable than those produced from state 3 (Examples 2 and 4). Inventive binders made using state 1 exhibit flexibility and smear properties intermediate to states 2 and 3. Examples 7–16 further show the effect on glass transition temperature of films formed from inventive binders using the polyurethane prepolymer/adduct reaction product.

2. Ionic Polyurethane Polymer/Adduct Reaction Product

When the inventive binder is produced from the reaction product of a plurality of ionic polyurethane polymers with an adduct, the polyurethane polymer provides flexibility and resilience to the inventive binder when cured. The polyurethane polymers are preferably of high molecular weight and water dispersible. As used herein the term "high molecular weight" means that the polyurethanes used in the inventive binder have a weight average molecular weight ranging from about 10,000 to about 50,000, more preferably ranging from about 25,000 to about 35,000.

Particularly preferred ionic polyurethane polymers are in the form of aqueous emulsions, also known as polyurethane "soaps." Examples of useful polyurethane emulsions are those known under the trade designations "IMPERNIL DLN" (Miles, Inc.) and "WITCOBOND 290H" (Witco Corporation, New York, N.Y.). Emulsified polyurethane polymers useful in the invention may have urethane linkages, urea linkages, or both urethane and urea linkages.

Ionic polyurethane polymers in emulsified form typically and preferably have as their ionic moieties pendant carboxyl or sulfonate groups, or quaternary ammonium ions in the polymer backbone. The ionic moieties render the polymer emulsifiable in water. Such groups also render the polymer reactive with epoxy- or amine-functional moieties. Preferably the ionic moiety is selected from the group consisting of pendant carboxyl, pendant sulfonate, pendant ammonium, and interchain ammonium moieties. The presently preferred ionic moiety is pendant carboxyl. The number of ionic moieties per polyurethane polymer is typically and preferably at least 1 ionic group per 300 molecular weight units of the polymer, more preferably from about 5 to about 50 ionic moieties per 1000 molecular weight units.

The second adduct (formed as an example in Reaction 3 below) comprises the reaction product of the amine-functional material and the epoxy-functional material, with the provisos that the second adduct has at least one epoxy functional group reactive with the ionic moieties and at least one amine functional group reactive with the ionic moieties.

The epoxy-functional material provides a means for adjusting the glass transition temperature of the inventive binder made in accordance with the ionic polyurethane polymer/adduct reaction product when cured, as in the polyurethane prepolymer/adduct method. Examples of epoxy-functional materials useful in the invention which are in the form of aqueous dispersions were previously mentioned and include those known under the trade designations "CMD-35201", "WD-510", and "CMD-WJ55-3540", all commercially available from Shell Chemicals, Inc., Houston, Tex., and "MS 9772", available from Ciba-Geigy.

The amine-functional material provides for crosslinking of the inventive binder made using the ionic polyurethane/adduct reaction product during curing. Examples of useful amine-functional materials are those designated in the previous discussion regarding the polyurethane prepolymer/adduct reaction product, particularly isophorone diamine. In addition to those amine-functional materials, the second adduct may have a plurality of epoxy moieties available for reaction with the ionic moieties of the ionic polyurethane polymers. In these embodiments of the inventive binder, the second adduct is generated in situ using compounds that initiate homopolymerization of the epoxy-functional material. Examples of such compounds are dicyandiamide, imidazole derivatives such as 2-methyl-imidazole, organic acid anhydrides, and organic acid hydrazides.

It is believed that when the epoxy-functional material and the amine-functional material are added to the polyurethane polymer emulsion, both the amine-functional material and the polyurethane polymer react with the epoxy functionalities of the epoxy-functional material (Reaction 3). Since the reactivity of the amine-functional material with the epoxy-functional material is generally higher than that of the amine-functional material with the polyurethane polymer, and since the excess epoxy moieties further react with the polyurethane, it is advantageous to add a sub-stoichiometric amount of the amine-functional material. The resulting adduct, having available unreacted epoxy groups, further reacts via those excess epoxy groups with excess ionic moieties on the polyurethane to create a tough, cured inventive binder (Reaction 4).

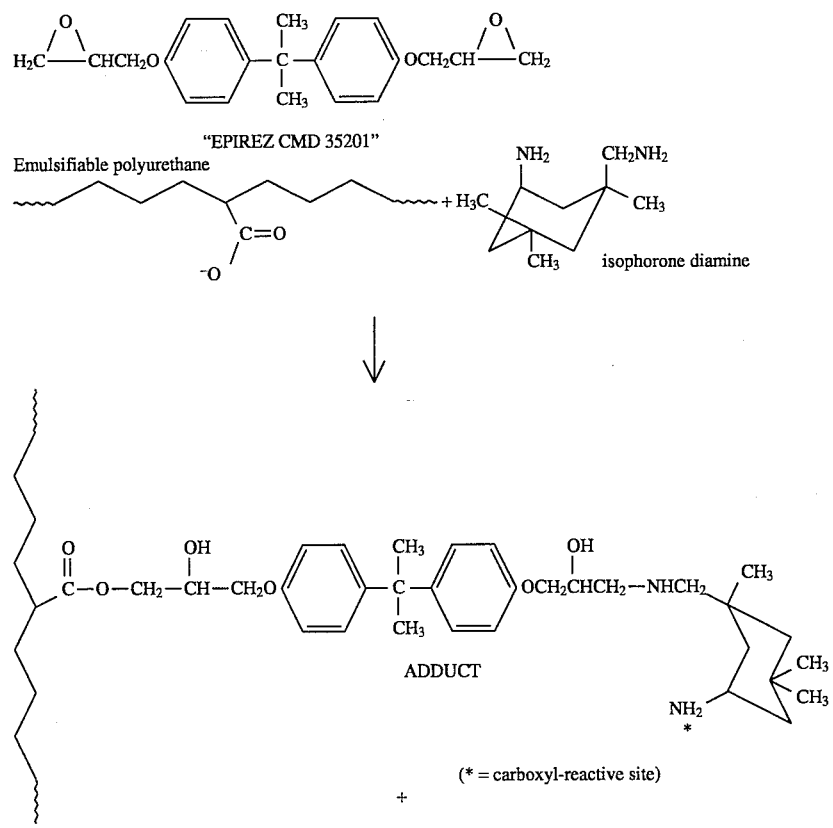

REACTION 3

-continued
REACTION 3

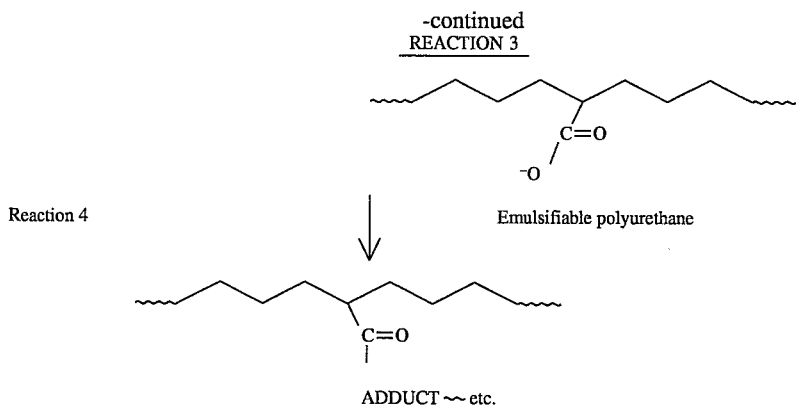

Reaction 4      Emulsifiable polyurethane

ADDUCT ~ etc.

3. Polyurethane Prepolymer/Amine Reaction Product

In this embodiment of the inventive binder, a plurality of linear blocked isocyanate-terminated polyurethane prepolymers are combined and emulsified with an amine-functional material having an average amine functionality of at least 2. Inventive binders of this nature are advantageous since they allow inherently water insoluble, organic solvent soluble smear-reducing additives, such as disclosed in U.S. Pat. No. 4,609,380, to be homogeneously carried into the emulsified polyurethane prepolymer/amine curative mixture, and obtain a stable emulsion.

The blocked polyurethane prepolymers and amine-functional materials useful in this aspect of the invention are those previously mentioned. An example of preparation of a useful blocked polyurethane prepolymer/amine-functional material emulsion is given in Examples 1–3 of Chin et al., U.S. Pat. No. 4,835,210.

Example 1 of Chin et al., describes formation of an isocyanate-terminated prepolymer under nitrogen by slowly adding, with stirring, 63.11 parts of polytetramethyleneether glycol having number average molecular weight of about 1000 to 24.56 parts of 2,4-toluene diisocyanate at 30°–40° C. As the temperature begins to rise, cooling water is circulated around the reaction vessel to remove the heat of reaction. The rate of addition of the polytetramethyleneether glycol is controlled to allow the exotherm not to go over about 80° C. The temperature is controlled at 80° C.±5° C. for about 2 hours or until an isocyanate content of 6.4% is obtained.

Example 2 of Chin et al. describes the use of methyl ethyl ketoxime to prepare a ketoxime-blocked isocyanate-terminated prepolymer. To one hundred parts of prepolymer from Example 1 of Chin et al. in a reactor under nitrogen atmosphere at 50°–65° C. is slowly added 14.06 parts of methyl ethyl ketoxime (0.35% water content) with stirring. The addition rate is adjusted so that the temperature does not exceed 80° C. and is controlled at about 79°–80° C. for one hour. The free isocyanate content rapidly falls to an undetectable level. The critical factor for protracted stability in water emulsion, as indicated by Chin et al., requires that the free isocyante be nil or slight residual excess of methyl ethyl ketoxime remains to ensure complete blocking of all the free isocyanate. The reaction mixture is cooled immediately to 60° C. and an emulsifier (combination of 1.7 parts polyoxyethylene sorbitan monooleate and 9.7 parts of sorbitan momooleate) is also added after the reaction mixture has cooled.

Example 3 of Chin et al. then explains the procedure used to prepare an aqueous dispersed prepolymer with p,p'-methylene dianiline. Molten p,p'-methylene dianiline ("MDA") was prepared by preheating it to 100° C. Then 6.13 parts were slowly added, with agitation, into 53.87 parts of emulsifiable, dispersable prepolymer prepared as in Example 2 which had been preheated to 60°–70° C. The temperature of the final mixture is 65°–70° C. The resulting blend was added to 40 parts of water also heated to 65°–71° C. with vigorous agitation. After all of the prepolymer/MDA blend had been added to the water and mixed for about 1.5 minute, the dispersion is removed from the heat and cooled.

Of course, other polyurethane prepolymers and amine-functional materials may similarly be employed, such as those previously mentioned.

As explained in Examples 34–36 of the present invention, when an emulsion of polyurethane prepolymer and amine-functional material is used, compatible smear-reducing additives, preferably polymers such as those disclosed in Barnett, U.S. Pat. No. 4,609,380, paragraph bridging columns 3 and 4, incorporated herein by reference, may be carried into the emulsion by appropriate use of organic solvents and surfactants. Compatible smear-reducing polymers have a glass transition temperature above about 50° C. The compatible polymer may be reactive with the polyurethane prepolymer/amine-functional material, or it may merely be in a physical mixture with it. The molecular weight of the compatible polymer is typically above about 2000. Examples of useful compatible polymers include a phenoxy resin sold under the trade designation "UCAR" Phenoxy PKHH resin by the Union Carbide Chemical Corporation, an epoxy resin based upon bisphenol A sold under the trade designation "Epon" 1007F by the Shell Chemical Company, a medium molecular weight partially hydrolyzed vinyl chloride/vinyl acetate copolymer sold under the trade designation "UCAR" VAGH-1 by Union Carbide Chemical Corporation, and styrene and allyl alcohol copolymer sold under the trade designation "RJ-100" by the Monsanto Polymers and PetroChemical Company.

Blends of the reaction product of the polyurethane prepolymer/amine-functional material and the compatible smear-reducing polymer should have a glass transition temperature of at least about 40° C., preferably at least about 50° C.

Organic solvents useful in solubilizing the compatible polymer include alkoxyalcohol acetates such as ethoxyethanol acetate. When high amounts of organic solvent are required to solubilize the compatible polymer, it is required to employ increasing amounts of surfactant to maintain a stable emulsion of blocked prepolymer/amine-functional material/compatible polymer. One useful surfactant has been found to be the common lubricant lithium stearate, but any petroleum based oil, fatty acid, or ester would suffice. If lithium stearate is employed, it is typically added as a slurry in a suitable organic solvent, such as ethoxyethanol acetate, with ratio of surfactant to organic solvent ranging from about 1:2 to about 2:1 on a weight basis.

Alternatively, if the binder precursor emulsions within this aspect of the invention do not comprise a smear-reducing compatible polymer and accompanying organic solvent and surfactant, the binder precursor emulsion must include a thickening agent, such as carboxymethylcellulose and others mentioned herein below, so that the emulsion is coatable.

Inventive binders made by any of the above reaction products may be either organic solvent-soluble or thermosetting and, in the unmodified, cured or dried state, preferably have an ultimate tensile strength of at least $20 \times 10^6$ Pa and an elongation at break of at least 100%. These physical properties of the inventive binders may be reduced somewhat by the addition of lubricants and/or other functional additives or fillers, if used, but, even with such decrease, the inventive binder adequately performs its function in adhering to the organic matrix.

The inventive binders may contain optional functional additives or fillers such as colorants, reinforcements, plasticizers, grinding aids, and/or conventional lubricants of the type presently used in surface treatment articles to adjust smear-resistance.

Examples of conventional lubricants include metal stearate salts such as lithium stearate and zinc stearate, or materials such as molybdenum disulfide, and the like. While such lubricants are known to reduce smearing somewhat, articles of the invention containing the binder system of the present invention and a conventional lubricant have an unexpectedly improved resistance to smearing over such articles with conventional binder systems containing lubricant.

Examples of colorants are inorganic pigments, organic dyes, and the like. Reinforcements may include, for example, short organic or inorganic fibers, spheres, or particles. Grinding aids may be materials such as poly(vinyl chloride), potassium fluoroborate, and the like. Fillers may include calcium carbonate, fumed silica, and other materials which are primarily inert with respect to the utility of the articles. Plasticizers may include, for example, phthalic acid esters, oils, and other relatively low molecular weight materials.

While unnecessary for many applications of the articles of the present invention, abrasive particles may be added to the binder system to render the inventive surface treatment article more aggressive in its action on a workpiece. Such abrasive particles, when employed to produce the surface treatment articles of the present invention, may be any known abrasive material commonly used in the abrasive art. The abrasive granule size and type may be any of those commonly used to make surface treatment articles. Examples of suitable abrasive particles include silicon carbide, aluminum oxide, cerium oxide, alumina zirconia, cubic boron nitride, garnet, pumice, sand, emery, mica, flint, talc, corundum, quartz, diamond, boron carbide, fused alumina, sintered alumina, alpha-alumina-based ceramic material (available from Minnesota Mining and Manufacturing Company, St. Paul, Minn. under the trade designation "CUBITRON"), and mixtures thereof. Agglomerate abrasive particles, such as those described in U.S. Pat. Nos. 4,652,275 and 4,799,939, may also find utility. It is considered within the skill of the artisan to select the appropriate abrasive material for the particular use without undue experimentation.

Aqueous Coatable Compositions

As previously stated, preferred inventive binders are applied to the organic matrix in the form of aqueous compositions (emulsions, dispersions, or slurries) including the polyurethane prepolymer/adduct reaction product, the ionic polyurethane polymer/adduct reaction product, and/or the blocked polyurethane prepolymer/amine functional material. The aqueous compositions may comprise plasticizers, viscosity modifiers, grinding aids and abrasive particles, the latter in the case of aqueous slurries.

Thickeners may be used to adjust the viscosity of the aqueous or organic solvent dispersed binder system, i.e., when in the liquid state, in order to provide for an easily-coatable composition. Examples of suitable thickeners include carboxymethyl cellulose, guar gum, gum tragacanth, homo- and copolymers of poly(vinyl alcohol), methyl cellulose, modified starch, and the like.

Organic Matrix

The organic matrix serves the function of providing strength and structural integrity to the surface treating articles of the present invention. On a more fundamental basis, the organic matrix serves the function of providing a substrate for the inventive binder and other binders.

The organic matrix may be either a solid or foamed organic polymer or a nonwoven web comprised of organic fibers, preferably hydrophilic organic fibers. If hydrophilic organic fibers are employed, a heating step may be eliminated or reduced as the fibers will absorb water from the emulsified binder. An example of a lofty, nonwoven web formed of crimped staple fibers adhered at points of contact with binder which contains abrasive particles is taught in U.S. Pat. No. 2,958,593 (Hoover et al.). U.S. Pat. No. 4,227,350 (Fitzer) discloses a matrix formed of three-dimensionally undulated inter-engaged autogenously bonded continuous filaments. The disclosures of these patents are incorporated herein by reference.

The organic matrix may be comprised of thermoplastic organic staple fibers, such as nylon (polyamide), polyester, and the like staple fibers or a combination of thermoplastic and cellulosic staple fibers, such as viscose rayon, and the like. Preferred thermoplastic fibers are nylon staple fibers, especially nylon 6,6. If a combination of thermoplastic organic fibers and cellulosic fibers are employed the weight of cellulosic fibers as a percentage of the total web weight may range from about 5 weight percent to about 50 weight percent. The staple fibers preferably have denier ranging from about 3 to 300, and length ranging from about 10 to 200 mm.

Surface Treating Articles

Surface treating articles within the present invention may take any of a variety of conventional forms such as sheets, blocks, strips, belts, brushes, rotary flaps, discs, or solid or foamed wheels. Especially useful forms are wheels in the form of a disc or right circular cylinder having dimensions which may be very small, e.g., a cylinder height on the order of a few millimeters, or very large, e.g., two meters or more, and a diameter which may be very small, e.g., on the order of a few centimeters, or very large, e.g., one meter or more. The wheels typically have a central opening for support by an appropriate arbor or other mechanical holding means to enable the wheel to be rotated in use. Wheel dimensions, configurations, means of support, and means of rotation are well known in the art. A useful summary of various wheel forms of surface treatment articles which may be made using the inventive binders are described in the publication "3M Wheels", published in 1990 by Minnesota Mining and Manufacturing Company, St. Paul, Minn. ("3M"), which is incorporated herein by reference.

Surface treatment articles of the present invention in which the organic matrix is engulfed by a binder may be prepared by forming a layered composite. Layered composites (known in the art as "slabs") may be produced by cutting, punching, or otherwise machining uncured or partially cured webs into sheets or discs which are then overlapped on one another and then compressed and cured to make a higher density slab. Such cutting, punching and other machining techniques are well known to those skilled in the art.

A layered composite may be used as the source of a multitude of articles of the invention each having various diameters, or all the same diameter, as required by the user. Articles of the invention may be produced from the layered composites by using appropriate machining techniques which are also well known in the art. For example, a wheel shape may be die cut from a slab of the layered composite. Additionally, ribbons, strips, or elongate segments of the layered composite may be spirally wound into a wheel shape while the binder is uncured or partially cured and then fully cured to yield a wheel.

FIG. 1 is a perspective schematic view of a polishing wheel 10 in accordance with the invention. Wheel 10 as shown includes a plurality of nonwoven webs 12 serving as the organic matrix. Each web was first engulfed by a binder system 14 comprised partially or totally of the inventive binder described herein. The webs were then stacked on top of one another and then compressed into the shape shown. Typical compression pressure ranges from about 3.5 kg/cm$^2$ to about 6.3 kg/cm$^2$, with typical temperatures ranging from about 100° C. to about 135° C. Wheel 10 is typically outfitted with an appropriate arbor hole 16 so that the wheel may be attached to a tool.

Figure 2:
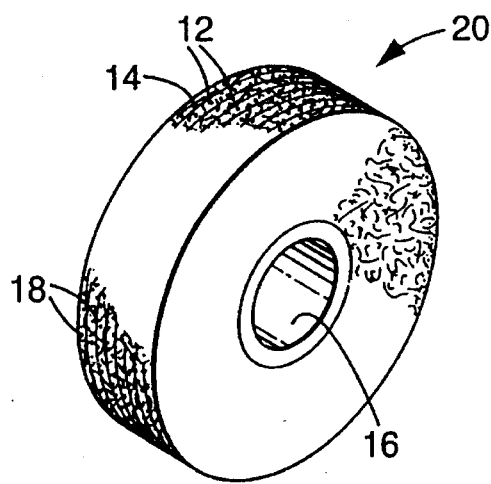
FIG. 2 is a perspective schematic view of a deburring wheel similar to the polishing wheel of FIG. 1 except including abrasive particles in the binder.

FIG. 2 illustrates in another perspective schematic view of a deburring wheel 20 in accordance with the invention, which is similar in all respects to the polishing wheel 10 of FIG. 1 except for the inclusion of abrasive particles 18 in the binder.

Figure 3:
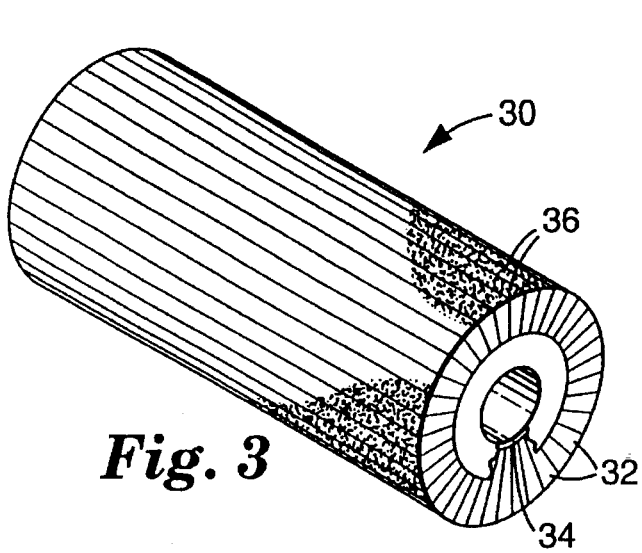
FIG. 3 is a perspective schematic view of a flap wheel of the invention.
Figure 3A:
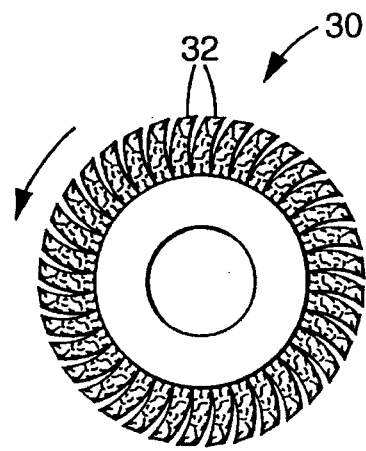
FIG. 3a is a side elevation view of a flap wheel in operation.

FIGS. 3 and 3a illustrate perspective schematic and side elevation views, respectively, of a flap brush 30 made in accordance with the invention. Flap brush 30 consists of a multitude of lofty, open, three-dimensional nonwoven articles 32 adhered along one major surface to a core 34, so that the tips of the fibers 36 protrude in a manner suitable for abrading a workpiece. FIG. 3a illustrates an exaggerated view of the flap brush of FIG. 3 might look when rotating in the direction of the arrow at operational speed. It can be seen that individual ones of the nonwoven articles 32 actually separate from each other, although the flap brush appears to be a solid article when stationary, as illustrated in FIG. 3. A general description of flap brushes is given in the 3M publication "Scotch-Brite High Resolution Printed Circuit Cleaning Brushes and Flap Brushes", published 1990, and is incorporated herein by reference.

Figure 4:
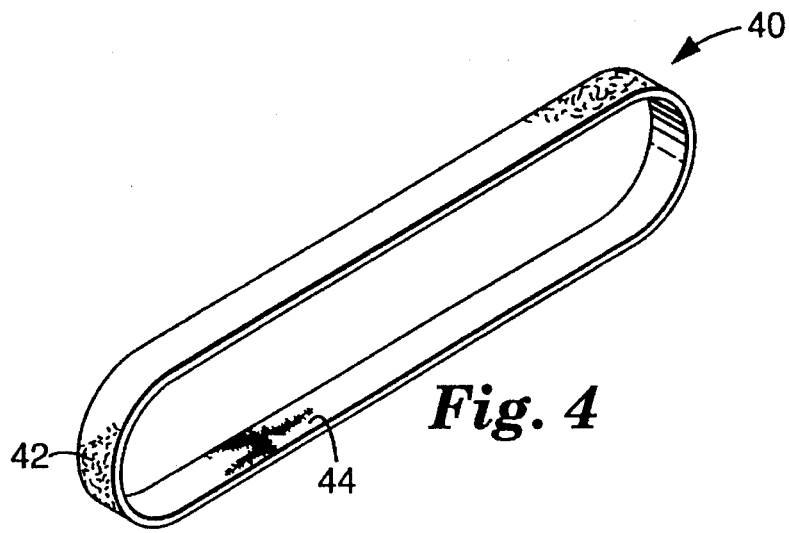
FIG. 4 is a reduced perspective view of an endless nonwoven belt in accordance with the invention.

Finally, FIG. 4 illustrates in perspective schematic an endless nonwoven abrasive belt 40 comprised of a plurality of organic fibers 42 bound together either by entangling (such as by hydroentanglement or needlepunching) and/or with a binder system including the inventive binder. Alternatively, the fibers may be entangled by virtue of employing crimped fibers. Articles of this nature may include abrasive particles adhered to the fibers by the binder system, and frequently employ a backing which rides on power driven contact wheels. Such backings may be selected from polymeric scrims and films, such as nylon and polyester, and the like. Articles of the type illustrated in FIG. 4 may be used for a variety of purposes, including buffing and polishing of metals, and may be used in conjunction with buffing compounds (bar, spray, or wet slurries). See generally the publication entitled "Scotch-Brite Surface Conditioning Belts", published in 1991 by 3M, incorporated herein by reference.

As may be seen from the above discussion, surface treatment articles of this invention are suitable for use in a wide variety of applications. They may be adapted for use on any workpiece composition including metal, wood, plastics, composites, glass, ceramics, concrete, and others. They may be designed for the aggressive removal of material from a workpiece, clean a workpiece in preparation for painting, plating, etc., to buff a surface to a bright finish, or to delicately wipe a surface free from liquids, and the like. See generally the "3M Wheels" publication, previously incorporated herein by reference.

Preferred surface treatment articles according to the present invention may include a plurality of binders, though only the inventive binder is essential to realize the benefits. For example, the fibers of a nonwoven web such as that illustrated in FIG. 4 may be lightly coated with a hard thermoset binder or a tough, elastomeric binder to create a substrate for subsequent binder coatings. This initial coating is known as a "prebond". A second, or "make" coating may then be applied to further strengthen, further harden, further toughen, and/or provide more abrasive particles to the composite. A third, or "size" coating may be then applied to further apply abrasive particles and to further strengthen the article. The inventive binder may be used in any or all of the binder coatings and, as is evidenced herein, is capable of supplying all of the qualities needed to produce such a composition. Optionally, for a particular surface treatment article, all binder coatings applied thereto may consist essentially of the inventive binder.

TEST METHODS

SMEAR TEST

The procedure used for testing the tendency of a surface treating wheel to transfer parts of itself to a workpiece, or smear, was as follows.

Wheels of 75 mm diameter with a 9.5 mm center hole and being 6 mm thick were mounted on the arbor of an air powered tool which was rotated at no-load rate of 13,500 to 14,200 revolutions per minute. The tool was supported in a stationary position and loaded to force the wheel against the test workpiece. The rotating wheel was forced at 35.6N (or sufficient force to cause a control sample to smear) against a 60 mm by 300 mm titanium metal plate which was mounted on a traversing table that moved, causing the wheel to make a 200 mm long path on the metal plate at the rate of 25 mm per second.

For comparative purposes, the tendency of an article to transfer material to the workpiece was subjectively rated by the following scheme:

| Rating | Observation |
| --- | --- |
| 1 | No transfer |
| 2 | Very slight transfer |
| 3 | Significant and objectionable transfer |
| 8 | Large amounts of transfer |
| 10 | Gross amounts of transfer |

The invention is further illustrated by the following non-limiting examples, wherein all parts are by weight unless otherwise specified.

EXAMPLES 1–6

A 15 mm thick low-density nonwoven web weighing 80 g/m$^2$ was formed from 13 denier nylon 6,6 38-mm staple fibers on a web forming machine available under the trade designation "Rando Webber". The resulting low-density web was roll coated with a prebond resin to provide a dry add-on weight of 45 g/m² using a coating solution consisting of 39.3% xylol, 16.1% of a solution of 35 parts methylene dianiline (MDA), and 65 parts 2-ethoxyethanol acetate, 44.6% ketoxime-blocked poly-1,4-butylene glycol diisocyanate having a molecular weight of about 1500 (sold under the trade designation "ADIPRENE BL-16" by Uniroyal Corporation), and a trace of a silicone defoamer. The prebond resin was cured to a non-tacky condition by passing the coated web through a convection oven maintained at 150° C. for a residence time of about 7 minutes. The resultant prebonded nonwoven web was about 10 mm thick and weighed about 126 g/m².

For Examples 1–5, to the above prebond was applied a slurry composition consisting of a 3% aqueous gel of "METHOCEL F4M" methyl cellulose viscosity modifier, isophorone diamine, softened tap water, ketoxime-blocked diisocyanate prepolymer made using the teachings of Examples 1 and 2 of Chin et al., U.S. Pat. No. 4,835,210, "EPI-REZ CMD-35201" epoxy prepolymer, a trace of silicone defoamer ("Q2", available from Dow Corning, Midland, Mich.) and a 1:1 mixture of 150 grit and 180 grit silicon carbide abrasive in the amounts shown in Table 1. The components were added to the mixing pot in the sequence just listed while the mixture was stirred continuously with a cage stirrer. Examples 1–5 vary only in the ratio of isophorone diamine to "EPI-REZ CMD-35201" and the amount of mineral to the total amount of resin components. The slurry coating was accomplished by using a 2-roll coater where the bottom roll was allowed to lap the slurry in the coating pan held thereunder while a doctor blade dispensed the same slurry on the top roll. The prebond web was passed through the nip between the rolls and the pressure between the rolls is adjusted to achieve the requisite coating weight. The coated prebond was passed through an oven set at 150° C. for about 7 minutes. At the end of the oven almost all of the water from the coating was driven off and the web was left with the remainder of the components. The coated web was stable to further reaction in the absence of heating, was non-tacky to the touch, and could easily be handled for further assembly of surface treating articles. No ketoxime odor was observed indicating that the blocked urethane prepolymer was yet unreacted into the resin.

Example 6 was prepared as Examples 1–5 with the exception that a mixed diamine composition with 4,4'-diaminodicyclohexylmethane as the major component, available under the trade designation "PACM-20" by Air Products and Chemicals Co., was substituted for isophorone diamine.

Surface treating wheels for performance testing were made from the coated web as follows: Eight 600 mm-square pieces of the coated web were stacked one upon the other and placed in a platen press heated to 135° C., compressed to 25 mm using a vacuum hose connected through an enclosing spacer and held under pressure for 35 minutes at the platen temperature while applying suction to the enclosed space in the platen. After this time, the cured slabs are taken out and allowed to further degas in an oven at atmospheric pressure and 135° C. for a period of 90 minutes. At the conclusion of this slab making process, the slab was cooled to room temperature and 25 mm-thick surface treating wheels are die cut to 203 mm outer diameter and with an arbor hole of 31.8 mm.

Wheels for smear testing were made as follows. Three 305 mm-square segments of partially dried resin-coated web were stacked together and placed in a platen press heated to 135° C. The web materials were compressed to a thickness of 6 mm and held at temperature for 15 minutes to produce an abrasive slab. The partially-cured slab was then removed from the press and cured further in a convection air oven for 90 minutes at 135° C. After allowing the cured slab to cool to room temperature, wheels having a 75 mm diameter and 9.5 mm center hole were cut from the 6 mm thick slab. A wheel of the Example 11 from Barnett et al. was made for the comparison of smear. In a comparison test of Barnett et al. versus this invention, testing pressures were such that one of the two wheels being compared was forced to produce a perceptible smear on the titanium sample.

The wheels of Examples 1–5 had a Shore A hardness of 80±5. The wheel of Example 6 had a Shore A hardness of 60±10.

The wheels of Examples 1–5 were tested for performance by measuring the time required to blend scratches on a 76×152×1.6 mm stainless steel coupon that were created by grinding each coupon with a grade 36 coated abrasive belt. Wheels of Example 1–4 were able to blend the scratches into the background in about 10 seconds. The wheel of Example 5 took twice as long to blend the scratches. The wheels wore away uniformly to expose new mineral.

The performance test of the wheel of Example 6 demonstrated that this wheel was more flexible under the same grinding conditions as wheels of Examples 1–5 and was able to clean and polish the interior surfaces of 3.2 mm deep grooves in steel articles.

COMPARATIVE EXAMPLE A

Comparative Example A was prepared according to Example 11 of U.S. Pat. No. 4,609,380.

A prebond nonwoven web was made identically to that previously described in Examples 1–6.

An adhesive binder consisting of 39.8% diethylene glycol monoethyl ether, 59% of a base-catalyzed phenol-formaldehyde resin having 70% non-volatiles, 1.2% of an aqueous sodium hydroxide solution (NaOH: $H_2O$ of 1:1) and 0.06% of fluorochemical surfactant (available from Minnesota Mining and Manufacturing Company under the trade designation "FC 170") was roll coated at the rate of 54 g/m² (dry weight basis) onto and into the prebond web described above. The wet adhesive-coated web was coated uniformly throughout with grade 100 (average particle size of 140 micrometers) silicon carbide abrasive particles at the rate of 815 g/m² by dispersing the abrasive particles in an air stream that was simultaneously directed onto both sides of the web.

A size coating consisting of 31.8% of the blocked diisocyanate functional urethane prepolymer once known under the trade designation "ADIPRENE L-315" (diisocyanate functional urethane prepolymer blocked by adding 14.8% 2-butanone oxime and 11.1% 2-ethoxyethanol acetate (available presently from Uniroyal under the trade designation "ADIPRENE BL-31"), 4.8% 4,4'-methylene-bis-aniline (MDA), 4.5% lithium stearate (lubricant), 1.4% xylol (solvent), 45.2% 2-ethoxyethanol acetate (solvent), and 12.3% "UCAR" Phenoxy PKHH (phenoxy resin having a molecular weight of about 30,000 available form Union Carbide Chemical Corporation) was then applied to the coated web at the dry add-on rate of 32% (based on the previously-coated web). The size coated web was then passed through a convection oven maintained at 70° C. for a residence time of approximately 4 minutes to partially dry and remove all but about 8.5% of the volatiles, based on the coated web final dry weight.

Wheels for smear testing were prepared from the above coated web by the procedure described previously. The smear test as previously described was conducted using sufficient pressure between the titanium coupon and the surface treating wheel to cause Comparative Example A to smear. The same pressure was then used to test the wheels of Examples 1 and 4. Results of a comparative smear test between Example 1 and 4 of the present invention and Comparative Example A are shown in Table 2.

TABLE 2

|  | Comparative Example A | Example 1 | Example 4 |
|---|---|---|---|
| Smear Rating | 3–4 | 1–2 | 9 |

EXAMPLES 7–16

Examples 7–16 demonstrate the wide control of the glass transition temperature ($T_g$) and therefore, hardness and/or flexibility, available within the scope of the present invention. The binder systems of these examples were prepared as in Example 1, but comprise the compositions indicated in Table 3, contain no abrasive particles and were cast on polyester films to a wet thickness of 0.25 mm and fully cured to a clear film in a convection oven at 120° C. The differences between Examples 7–16 are the relative amounts of epoxy precursor and polyurethane precursor employed in the preparation of the various examples. Table 3 also shows the $T_g$ of each cured composition. Examples 7–12 produced hard and brittle cured polymers. Example 13 demonstrated a marked increase in flex fatigue resistance. Example 14–16 were all flexible and resilient, thus demonstrating the wide range of material properties achievable.

EXAMPLES 17 AND 18

Examples 17 and 18 and Comparative Example B illustrate the benefits of the present invention when employed to make buffing, polishing, or wiping articles.

Example 17 was prepared from a composition containing 69% "IMPERNIL DLN" urethane emulsion (available from Miles, Inc.), 8% "EPI-REZ CMD-35201" (available from Rhone Poulenc), 8% of a 3% solution "METHOCEL F4M" (available from Dow Chemical Company) in water, and 15% water. No abrasive particles were included in this composition. All ingredients were combined in the order listed and stirred to produce a homogeneous coatable liquid emulsion. This prepared emulsion was coated onto a nonwoven fabric of 6 denier nylon 6,6 staple fibers weighing 157 g/m² by the use of a 2-roll coater. Rectangular pieces of dimensions 228 mm×280 mm were passed through the coater so that each piece weighing about 10 grams would receive about 3 grams (dry basis) of resin coating. The resin mixture was completely absorbed by the nonwoven fabric when the coating was applied under a pressure of about 3.52 kg/cm². The coated pieces were essentially dry to the touch and were made into slabs of 12, 16, and 18 layers per inch by placing the stacks of coated fabric between the platens of a press heated to about 107° C. The stacks were compressed to a thickness of 25 mm while a vacuum of at least 15 inches of water was applied via a combination spacer and seal and the platen pressure maintained at 12 kg/cm² for 2.5 hours. The slabs were then removed from the press and further cured in an air convection oven at 120° C. for an additional 1.5 hours. The slabs were then cooled and cut into wheels of dimensions 203 mm outside diameter, 25 mm internal diameter, and 25 mm thick.

Example 18 was prepared by coating the binder composition of Example 17 onto an air-laid needlepunched nonwoven fabric pad available from Minnesota Mining and Manufacturing Company, St. Paul, Minn. under the trade designation "Type T Clean and Polish" surface conditioning material. The binder composition was applied to achieve 50% dry add-on onto 228 mm×280 mm pieces of the pad. Twelve layers of the coated fabric were pressed to a slab 25 mm thick as previously described. 203 mm o.d. wheels with 25 mm center holes were cut from the slab.

Example 19 was prepared similarly to Example 17, but provides a harder buffing article by increasing the epoxy:urethane ratio and providing an epoxy curative.

A composition containing 63.3% "EPI-REZ CMD-35201" epoxy, 1.18% isophoronediamine and 35.52% "IMPERNIL-DLN" urethane was coated on Type-T nonwoven pad at a level to reflect 100% increase in the weight of the pad when completely cured by heating. Six layers of coated and uncured (wet) web was pressed in a heated platen press under vacuum to a cured slab thickness of 25 mm. The slab was left under the press for 2.5 hours. Then the slab was cooled to room temperature and a wheel of 203 mm outer diameter and 31.8 mm arbor hole was cut out for testing in a lathe.

The test involved rotating the wheels at 2000 rpm while a steel test coupon was held against the grinding surface of the wheel. The softer wheels of example 17 and 18 were relatively less aggressive and provided a shiny finish on the metal. The harder wheel of example 19 was relatively more aggressive and created rougher scratch patterns on the test piece.

EXAMPLES 20–26

Examples 20 through 26 demonstrate the efficacy of the binder system of the present invention when used to make more aggressive grinding wheels.

The slurry formulations shown in Table 4 were roll-coated onto prebonded webs made identically to those employed in Examples 1–6 such that the dry add-on amounts were about 700% of the weight of the prebonded web. Surface treating wheels of dimensions 203 mm outside diameter, 31.8 mm centerhole diameter, and 25 mm thick were cut from slabs prepared by compressing 8 layers of coated and uncured prebonded web to a final thickness of 25 mm.

The hardest wheel in Examples 20–26 was Example 24, yet it was able to penetrate grooves 1.6 mm deep in cold rolled steel test samples when urged against the rotating wheel at 2000 rpm. The softest wheel was from Example 20 and was soft enough to be folded in half by a person of average strength yet spring back to its original form when released without showing evidence of inter-layer separation. The wheel from this example was rotated at 2000 rpm while flat and grooved steel and brass articles were urged against it. This wheel provided a substantially wider "footprint" against the workpiece, made a finer scratch pattern than the other example wheels, and was sufficiently conformable to finish grooves 3.2 mm deep.

EXAMPLES 27–29

Examples 27 through 29 illustrate the utility of the binder system of the present invention in the manufacture of nonwoven surface treating flap brushes. For these examples, flap brushes were prepared that were similar to those commercially available from Minnesota Mining and Manufacturing Company with the trade designation "A-VF-7", but employing the binder system of the invention as a final size coating. The brushes of these examples were of dimensions 200 mm o.d., 76 mm i.d and 50 mm thick. The formulations used to coat the brushes of these examples are shown in Table 5. The Brookfield viscosity of the mixtures was 150 cps at 22° C. The flap brush was mounted on a vertical spinning mandrel of the appropriate size to hold the 50 mm brush. The container with the resin emulsion mixture was placed under the brush and raised to immerse the brush completely in the mixture. The time of immersion was 10 minutes. At the end of this period, the resin container was lowered such that the brush is completely above the liquid surface. The vertical holding mandrel was then spun at 2,000 revolutions per minute to centrifuge the excess resin from the brush. When all the excess resin had been forced out, the walls of the container do not receive additional drops as the mandrel continues to spin. At this point the mandrel is stopped, the brush taken out and weighed. The increase in weight of the brush provides the "wet" weight of the resin added onto the brush and from the amount of water present in the resin mixture, the theoretical final weight of the cured brush was calculated. The dry add-on resin weight was estimated to be 13 (±1%) of the weight of the brush before the dip-and-spin process. The wet brush was then cured in an oven at 120° C. for four hours.

The cured brushes were cooled to room temperature and tested by rotating the brushes at 1900 revolutions per minute while urging a weighed, stainless steel test coupon against the surface of each brush. The test results are shown in Table 6.

EXAMPLE 30

This example demonstrates the utility of the binder of the present invention when incorporated in the preparation of a glass polishing wheel. An air-laid needlepunched nonwoven fabric pad available from Minnesota Mining and Manufacturing Company, St. Paul, Minn. under the trade designation "Type T Clean and Polish" surface conditioning material was the starting substrate for this example. A sample of this mildly abrasive web was coated with an aqueous binder system of the present invention consisting of:

| Component | Percent by Weight |
| --- | --- |
| cerium oxide[1] | 26 |
| "WITCOBOND 290H"[2] | 11 |
| "CMD-35201"[3] | 10.7 |
| "METHOCEL F4M"[4] | 52 |
| 2-methylimidazole | 0.3 |
| "Q2"[5] | 15 grams in 45.5 kilograms |

[1]3–4 micrometer particles available from Cercoa, Inc., Lake Park, Florida.
[2]polyurethane emulsion, available from Witco Corporation, Organics Division, New York, NY.
[3]epoxy emulsion, available from Rhone-Poulenc, Inc., Princeton, NJ.
[4]methyl cellulose viscosity modifier, available from Dow chemical Co., Midland MI.
[5]silicone antifoam, available from Dow Corning Corporation, Midland, MI.

This coating was applied to achieve a total dry web weight of 733 g/m². While still wet with this coating, the web was wound spirally about itself under tension to form a "jelly roll"-type structure. This structure was restrained by wrapping with a moisture-permeable flexible paper board secured by reinforced adhesive tape and then cured for 1 hour at 105° C. and then further cured for 8 hours at 135° C. The cured structure was then cut into 38-mm thick sections to form wheels. The resulting wheels had a density of about 490 kg/m³. The wheels were then adhesively attached to injection-molded nylon back-up plates and tested in a lapping operation on television tube seal edges. The wheels provided a high degree of polish to the seal edges of the glass tube.

EXAMPLE 31 AND COMPARATIVE EXAMPLE B

Example 31 and Comparative Example B illustrate the utility of the present invention when employed in the preparation of surface treating belts.

A 61-cm wide, lofty, open, nonwoven air-laid web was made of 58 denier×38 mm nylon 6,6 staple fiber to a weight of 301 g/m². The resulting web was then placed on a 6×6 ends/cm plain weave nylon mesh screen of 840 denier per yarn and needle-tacked together to a punch density of 30 penetrations/cm² using 15×18×25×3.5 barbed needles available from Foster Needle Company, Manitowoc, Wis. under the designation "6-32-5.5B/3B/2E/L90". The penetration depth was 22 mm. This operation resulted in a consolidated laminate with about one-third of the fiber penetrating to the lower surface of the woven fabric and about two-thirds remaining on the upper side of the woven fabric. One sample of the needled web was impregnated with a control resin mix (Comparative Example B), and a second sample with the experimental resin mix of this invention via a 2-roll coater as follows:

| Component or Property | Comparative Example B | Example 31 |
| --- | --- | --- |
| "ADIPRENE BL-16"[1] | 35.4 | — |
| methylene dianiline[2] | 12.3 | — |
| lithium stearate premix[3] | 2.22 | — |
| "WITCOBOND 290H" | — | 70.1 |
| "EPI-REZ CMD 35201" | — | 29.8 |
| 2-methylimidazole | — | 0.2 |
| viscosity, centipoise[4] | 1150 | 1800 |
| dry coating weight, g/m2 | 440 | 360 |

[1]Ketoxime-blocked isocyanate prepolymer, available from Uniroyal Chemical Co., Inc., Middlebury, CT
[2]35% solution in propylene glycol monomethyl ether acetate
[3]44.1% dispersion in propylene glycol monomethyl ether acetate, lithium stearate available from Witco Corp., Chicago, IL under the trade designation "Type FS".
[4]measured using Brookfield viscometer, # 2 spindle, at 23° C., 12 rpm.

Both examples were heated in a convection oven for 5 minutes at 160° C. A slurry spray coat was then applied to both examples. The slurry formulation consisted of 17.0 parts propylene glycol monomethyl ether, 20.8 parts base-catalyzed resole phenolformaldehyde resin, 4.8 parts of a mixture further consisting of 80 parts "ACELUBE 23N" hydrocarbon distillate, (available from Gopher Oil Company, Minneapolis, Minn.), and 20 parts 325 mesh bentonite (available under the trade designation "VOLCAY" from American Colloid Company, Arlington Heights, Ill.), 58.3 parts grade 100/150 Al₂O₃ abrasive particles, and 4.7 parts "EPICURE 852", an aminofunctional curing agent available from Rhone-Poulenc, Inc., Princeton, N.J. The resulting solution had a viscosity of about 2000 cps. The mineral slurry was sprayed onto the top (the side with more fiber) surface of the web and cured in a convection oven for 10 minutes at 177° C. The dry weight of the slurry coating was 1080 g/m² for Comparative Example B and 1190 g/m² for Example 31.

These surface treating articles were tested for performance as an endless belt. The webs were converted into 76×229 mm endless belts by conventional means and mounted on a floor stand lathe (Hammond Model7VRO-B, available from Hammond Machine Services, Inc., Rockford, Ill.) that employs a 356-mm diameter×76 mm wide contact wheel of about 85 Durometer rubber with 9.5 mm deep, 45 angle serrations. The speed was adjusted to about 1810 rpm. A fixture was adapted to sequentially urge two test bars of 1018 cold rolled steel (12.7 mm diameter by 356 mm long) against each driven test belt. A 9.55 kg weight was attached to the fixture to apply constant force at the grinding interface. The tests were conducted for six two-minute cycles. Each cycle consisted of 4 30-second cutting intervals (two for each bar). Following a first 30-second cut on each bar, the bars were manually indexed along their length to provide a new contact surface. Between each cycle, the bars were rotated 180 degrees about their long axes. Upon the completion of the required 6 grinding cycles, the belt cut and the belt wear was determined by measuring the weight lost by the bars (cut) and by the belts (wear). The results, shown in the following table, indicate that the belts constructed with the binder system of the invention have comparable cut and considerably less wear that a belt made with a conventional binder system.

|  | Comparative Ex. B | Example 31 |
| --- | --- | --- |
| belt cut, grams | 171 | 157 |
| belt wear, grams | 63 | 29 |
| efficiency, cut/wear | 2.71 | 5.4 |

EXAMPLES 32 AND 33

Examples 32 and 33 further demonstrate the incorporation of functional fillers and lubricants in the binder system of the present invention.

Example 32 was made identically to Example 1 with the exception that 2.26 parts of a slurry of 41 parts talc and 59 parts 3% aqueous "METHOCEL F4M" was added to the slurry.

Example 33 was made identically to Example 1 with the exception that an equivalent amount of a mixture of 88% ketoxime-blocked diisocyanate prepolymer made using the teachings of Examples 1 and 2 of Chin et al., U.S. Pat. No. 4,835,210, and 12% lithium stearate was substituted for the ketoxime-blocked diisocyanate prepolymer.

The compositions of the coatings and properties of the resulting surface treating articles are shown below. Wheels of both examples were acceptable smear-resistant surface treating articles.

| Component/Property | Ex. 32 | Ex. 33 |
| --- | --- | --- |
| METHOCEL F4M[9], 3% aqueous | 13.58 | 13.58 |
| isophorone diamine[10] | 2.19 | 2.19 |
| water | 8.80 | 8.80 |
| ketoxime-blocked poly-1,4-butylene glycol diisocyanate having a molecular weight of about 1500[11] | 22.63 | 0 |
| ketoxime-blocked poly-1,4-butylene glycol diisocyanate having a molecular weight of about 1500[11]/ lithium stearate mix[12] | 0 | 22.63 |
| EPI-REZ CMD 35201[13] | 30.17 | 30.17 |
| abrasive particles[14] | 22.63 | 22.63 |
| talc[15] | 2.26 | 0 |
| defoamer[16] | 0.02 | 0.02 |
| wet add-on[17] | 1100% | 1100% |
| hardness, Shore A | 80 ± 5 | 80 ± 5 |
| smear rating | 1–2 | 1 |

[9] methyl cellulose viscosity modifier, available commercially from Dow Chemical Co., Midland, MI.
[10] epoxy curative available from Hüls America, Inc., Piscataway, NJ.
[11] isocyanate prepolymer, available from Uniroyal Chemical Co., Inc., Middlebury, CT, which is used in a ketoxime-blocked form produced using the methods of U.S. Pat. No. 4,835,210 (Chin et al.), Example 2
[12] mixture of 12% lithium stearate in the blocked diisocyanate prepolymer.
[13] 60% emulsion of bisphenol-A diepoxide with an equivalent weight of 700 g. per mole of epoxide group, available from Shell Chemicals, Inc., Houston, TX.
[14] 1:1 mixture of grade 150 and grade 180 silicon carbide abrasive particles.
[15] a slurry of 41 parts talc in 59 parts 3% aqueous "METHOCEL F4M".
[16] "Q2" brand silicone defoamer, available from Dow Corning Co. Inc., Midland, MI.
[17] Add-on based on the weight of the nonwoven fabric prebond.

TABLE 1

| Component | Ex. 1 | Ex. 2 | Ex. 3 | Ex. 4 | Ex. 5 | Ex. 6 |
| --- | --- | --- | --- | --- | --- | --- |
| METHOCEL F4M[1], 3% aqueous | 13.58 | 13.28 | 10.04 | 9.88 | 11.44 | 9.88 |
| isophorone diamine[2] | 2.19 | 4.30 | 1.62 | 3.20 | 2.77 | 0 |
| PACM-20[3] | 0 | 0 | 0 | 0 | 0 | 3.20 |
| water | 8.80 | 8.61 | 6.51 | 6.40 | 7.41 | 6.40 |
| ADIPRENE L-167[4] | 22.63 | 22.14 | 16.74 | 16.47 | 19.06 | 16.47 |
| EPI-REZ CMD 35201[5] | 30.17 | 29.51 | 22.31 | 21.95 | 25.41 | 21.95 |
| abrasive particles[6] | 22.63 | 22.14 | 42.77 | 42.08 | 33.88 | 42.08 |
| defoamer[7] | 0.02 | 0.02 | 0.02 | 0.02 | 0.02 | 0.02 |
| wet add-on[8] | 1062% | 1084% | 1198% | 1057% | 828% | 1057% |

[1] methyl cellulose viscosity modifier, available commercially from Dow Chemical Co., Midland, MI.
[2] epoxy curative available from Hüls America, Inc., Piscataway, NJ.
[3] 4,4'-diaminodicyclohexylmethane, available from Air Products and Chemicals Co., Allentown, PA.
[4] isocyanate prepolymer, available from Uniroyal Chemical Co., Inc., Middlebury, CT, which is used in a ketoxime-blocked form produced using the methods of U.S. Pat. No. 4,835,210 (Chin et al.), Example 2
[5] 60% emulsion of bisphenol-A diepoxide with an equivalent weight of 700 g. per mole of epoxide group, available from Shell Chemicals, Inc., Houston, TX.
[6] 1:1 mixture of grade 150 and grade 180 silicon carbide abrasive particles.
[7] "Q2" brand silicone defoamer, available from Dow Corning Co., Inc., Midland, MI.
[8] Add-on based on the weight of the nonwoven fabric prebond.

TABLE 3

| Component | Ex. 7 | Ex. 8 | Ex. 9 | Ex. 10 | Ex. 11 |
| --- | --- | --- | --- | --- | --- |
| "EPI-REZ" epoxy (60%) | 93 | 88 | 87 | 82 | 77 |
| isophorone diamine (100%) | 2 | 2 | 2 | 2 | 2 |
| "IMPERNIL DLN"[9] PU emulsion (40%) | 5 | 10 | 13 | 16 | 21 |
| Tg, °C. (DSC) | 47.2 | 44.5 | 41.8 | 40.0 | 33.2 |

| Component | Ex. 12 | Ex. 13 | Ex. 14 | Ex. 15 | Ex. 16 |
| --- | --- | --- | --- | --- | --- |
| "EPI-REZ" epoxy (60%) | 73% | 70% | 67% | 63% | 60% |

TABLE 3-continued

| | | | | | |
|---|---|---|---|---|---|
| isophorone diamine (100%) | 1% | 1% | 1% | 1% | 1% |
| "IMPERNIL DLN" PU emulsion (40%) | 26% | 29% | 32% | 36% | 39% |
| Tg, °C. (DSC) | 33.3 | 30.8 | 25.8 | <20 | <20 |

[9]A 40% solids polyurethane emulsion available from Mobay Chemical Company

TABLE 4

| Component | Ex. 20 | Ex. 21 | Ex. 22 | Ex. 23 | Ex. 24 | Ex. 25 | Ex. 26 |
|---|---|---|---|---|---|---|---|
| Witcobond 290H | 52 | 52 | 52 | 44 | 38 | 44 | 44 |
| 2-methylimidazole | 0 | 0 | 0.08 | 0 | 0.3 | 0.2 | 0 |
| isophorone diamine | 0 | 0.2 | 0 | 0 | 0 | 0 | 0.5 |
| EPI-REZ CMD 35201 | 5.2 | 5.2 | 5.2 | 13.2 | 19 | 13.2 | 13.2 |
| Abrasive grains | 23 | 23 | 23 | 23 | 23 | 23 | 23 |
| Characteristics | Very flexible | flexible | flexible | mod. hard | hardest | harder | hard |

TABLE 5

| Component/parts | Ex. 27 | Ex. 28 Parts by Weight | Ex. 29 |
|---|---|---|---|
| CMD-35201 epoxy emulsion | 55 | 55 | 55 |
| "LUPHEN D 200 A"[10] | 45 | 0 | 45 |
| "IMPERNIL-DLN"[11] | 0 | 45 | 0 |
| 2-methylimidazole | 0.5 | 0.5 | 0 |
| isophoronediamine | 0 | 0 | 1 |
| water | 20 | 20 | 20 |

TABLE 6

| Property | Ex. 27 | Ex. 28 | Ex. 29 |
|---|---|---|---|
| cut, grams | 9.0 | 6.0 | 7.4 |
| wear, grams | 6.0 | 4.8 | 3.3 |

[10]Polyurethane emulsion, commercially available from BASF, Ludwigshafen, Germany.
[11]Polyurethane emulsion, commercially available from Bayer AG, Leverkusen, Germany.

EXAMPLES 34–36

Coating randomly air-laid nylon staple fibers to produce lofty nonwoven web

A 15 mm thick low density nonwoven web weighing g/m² was formed from 13 denier nylon 6,6 38 mm staple fibers on a web forming machine available under the trade designation "Rando Webber". The resulting low density web was roll coated with a resin of the compositions in the following table to provide a dry add-on weight of 45 g/m². The coated web was passed through a convection oven maintained at 150° C. for a residence time of about 1 minute to make a porous, lofty and non-tacky prebonded web.

| | Example Number: | | |
|---|---|---|---|
| | 34 | 35 | 36 |
| xylol | 39.3 | 0 | 0 |

| | Example Number: | | |
|---|---|---|---|
| | 34 | 35 | 36 |
| 35% methylene dianiline in 2-ethoxyethanol acetate | 16.1 | 10.5 | 7.7 |
| ketoxime-blocked poly-1,4-butylene glycol diisocyanate having a molecular weight of about 1500[1] | 46.6 | 0 | 0 |
| ketoxime-blocked isocyanate-terminated prepolymer[2] | 0 | 33.1 | 24.3 |
| Water at 70° C. | 0 | 52.2 | 38.3 |
| 3% aqueous gel of methylcellulose[3] | 0 | 4.2 | 29.7 |
| nonionic surfactant[4] | 0 | 0.075 | 0.055 |

[1]available unde the trade designation "Adiprene BL-16", from Uniroyal Chemical company, Inc., Middlebury, CT
[2]made in accordance with the teachings of Chin et al., U.S. Pat. No. 4,835,210, Examples 1–2
[3]known under the trade designation "Methocel F4M", available from Dow Chemical, Midland, MI.
[4]nonionic surfactant known under the trade designation "Triton GR5", available from Rohm and Haas Company, Philadelphia, PA Compositions 34 and 35 were mixed in the order listed (from top to bottom). A high shear mixer/emulsifier such as available from Gifford-Wood (Hudson, N.Y.) was used to make an emulsion after adding all components except methylcellulose and nonionic surfactant. After adding these two in the order listed, a cage stirrer was used to create a uniform consistency. Composition 35 was approximately 500 mPa in viscosity while composition 36 was at 2200 mPa, as measured using A Brookfield viscometer at 20° C. and using spindles LV-2 (Example 35) and LV-3 (Example 36), each at 30 rpm.

While attempting to coat the composition of Example 35 on the randomly air-laid nylon fiber web, the fibers were picked off from the mat onto the upper of the two rolls used to coat the air-laid web. Persistent continuance of the coating operation resulting in further fiber loss to the upper roll, resulting in the contamination of the coating liquid with the fibers. The interference of such loose fibers created "lumpiness" in the coated web as well as a pattern of projecting fibers on the top side in the cured prebonded construction. The compositions of Examples 34 and 36 were coated with ease without the above problems and cured to produce porous lofty constructions of average thickness of 10 mm and weight of about 170 g/m².

Tensile Tests of prebonded samples from Examples 34, 36

Rectangular pieces of dimensions 51 mm wide and 178 mm long were die-cut from the prebonded web from Examples 34 and 36 such that samples were obtained with their length aspect in both cross web and machine direction. The tensile strengths of the samples were determined using an Instron Tensile Tester. The sample was held in the jaws of the tester such that the gap between the jaws was 127 mm. The sample was elongated at a rate of 254 mm per minute and the peak strength of the web before it broke was measured.

| | Peak Tensile strength*: | |
| --- | --- | --- |
| | Web Example 34 | Web Example 36 |
| Machine direction | 182.4 N/51 mm | 182.8 N/51 mm |
| Cross web direction | 195.7 N/51 mm | 179.7 N/51 mm |

Note: Sample size in each case, n = 8, standard deviation ranged from 7 to 14N.

The peak tensile strength data from Examples 34 and 36 illustrated that the application of an emulsified, blocked isocyanate end-capped linear polyurethane prepolymer and a diamine curative for binding fibers to make an open, porous prebonded web for further application in nonwoven abrasives was not feasible by the immediate application of the chemistry of Chin et al. but required unobvious additional thickening agent, and emulsifier to achieve this end.

EXAMPLES 37–39

EXAMPLES 37

To 62.8 grams of an emulsion containing 24.7 parts of an emulsifiable ketoxime-blocked polyurethane prepolymer derived from the reactants and procedures of Examples 1–2 of Chin et al., U.S. Pat. No. 4,835,210, 7.7 parts of a 35% solution of methylene dianiline in ethoxyethanol acetate (available from BASF Corporation, Parsippany, N.J.), 60.1 parts of water and 7.5 parts of a 3% aqueous methylcellulose gel known under the trade designation "Methocel F4M" was added a 4 gram amount of a 25% solution of phenoxy resin pellets known under the trade designation "UCAR" Phenoxy PKHH (Union Carbide Chemical Corporation) in ethoxyethanol acetate and the mixture stirred vigorously with a cage stirrer. The added phenoxy resin congealed into a semi-solid in the midst of the emulsion and the emulsion was no longer homogeneous.

EXAMPLE 38

A mixture of 27.4 grams of a 35% solution of methylene dianiline in ethoxyethanol acetate, 98 grams of a 25% solution of "UCAR" Phenoxy PKHH resin in ethoxyethanol acetate, and 80 grams of an emulsifiable ketoxime-blocked polyurethane prepolymer derived from the reactants and procedures of Examples 1–2 of Chin et al., U.S. Pat. No. 4,835,210, was prepared and the composition mixed well with a cage stirrer. The mixture was homogeneous except for entrained air bubbles due to mixing. To 61 grams of this mixture 24 grams of water at 80° C. was added and the two phase mixture was homogenized for 2 minutes using a Gifford-Wood homo-mixer. The mixture was pale yellow with smooth creamy consistency. On standing in a closed container, the mixture separated into two phases and after 12 hours a 23% of the total volume of the mixture consisted of the exo-emulsion supernatant of mostly the organic solvent in the mixture.

EXAMPLE 39

A mixture 49.4 grams of a 25% solution of "UCAR" Phenoxy PKHH resin in ethoxyethanol acetate, 4.44 grams of diethyltoluene diamine, and 39 grams of an emulsifiable ketoxime-blocked polyurethane prepolymer derived from the reactants and procedures of Example 1–2 of Chin et al., U.S. Pat. No. 4,835,210, was prepared and the composition was further mixed with 25 mg of a 90:10 mixture of oleic acid (Industrene-106 from Witco Organics Inc., Chicago, Ill.) and 1,4-diazabicyclo[2,2,2]-octane (available under the trade desognation "Dabco-TMR" from Air Products and Chemicals, Allentown, Pa.) and stirred well with a cage stirrer. The mixture was pale green and homogeneous except for entrained air bubbles due to mixing. To 50 grams of this mixture 25 grams of water at 80° C. was added and the two phase mixture was homogenized for 2 minutes using a Gifford-Wood homo-mixer. The mixture was pale blue in color with smooth creamy consistency. On standing in a closed container, the mixture separated into two phases and after 12 hours an 18% of the total volume of the mixture consisted of the exo-emulsion supernatant of mostly the organic solvent in the mixture.

| Example No. | Solvent wt % | Unemulsified Solvent vol. % |
| --- | --- | --- |
| 38 | 31.9 | 23 |
| 39 | 26.6 | 18 |

This data illustrated that greater than two thirds of the organic solvent carrier that had to be used to accommodate the smear-reducing additive did not form a homogeneous emulsion with the other components. Example 37 illustrated that a simple mixing of the smear-reducing additive (phenoxy resin) into an emulsion of the blocked prepolymer and a diamine curative precipitated the smear-reducing additive making the use of such composition unfeasible in coating procedures commonly employed.

EXAMPLE 40

A mixture containing 92 grams each of an emulsifiable ketoxime-blocked polyurethane prepolymer derived from the reactants and procedures of Examples 1–2 of Chin et al., U.S. Pat. No. 4,835,210 and a 25% solution of "UCAR" Phenoxy PKHH resin in ethoxyethanol acetate was placed in an oven at 70° C. for 24 hours. At the end of this period the mixture weighed 151 grams signifying a 48% loss of available organic solvent. To this mixture 9.96 grams of diethyl toluene diamine was added, and mixture re-equilibrated to 70° C. To 50 grams of this warm emulsifiable mixture, 50 grams of water at 80° C. was added and the mixture was homogenized for 2 minutes as before. The mixture evolved into a stringy consistency of heterogeneous phases.

Example 40 illustrated that it was not immediately feasible to remove part of the carrier organic solvent from the smear-reducing additive solution and be able to form a uniform emulsion with the emulsifiable prepolymer and a diamine curative. In Examples 35 and 36 further surfactant was added beyond what was already present in the emulsion of a ketoxime-blocked polyurethane prepolymer derived from the reactants and procedures of Chin et al., U.S. Pat. No. 4,835,210, in order to accommodate the organic solvent present in the curative solution. In the following example we applied the same to accommodate the addition of the organic solvent soluble phenoxy resin within the emulsion. Chin et al.'s disclosures do not include such variations required for making such emulsions of blocked isocyanate end capped prepolymers and diamine curatives so that such binder systems can be applied for nonwoven articles.

EXAMPLE 41

A mixture of 200 grams of water, 200 grams of an emulsifiable ketoxime-blocked polyurethane prepolymer derived from the reactants and procedures of Examples 1–2 of Chin et al., U.S. Pat. No. 4,835,210, 75 grams of a 35% solution of methylene dianiline in ethoxyethanol acetate, 100 grams of a 25% solution of "UCAR" Phenoxy PKHH phenoxy resin in ethoxyethanol acetate and 70 grams of a slurry of lithium stearate in ethoxyethanol acetate prepared by vigorously mixing 44 parts of the lithium stearate powder with 56 parts of the organic solvent was homogenized using a Gifford Woods homomixer. After 5 minutes of homogenizing the emulsion obtained was white and had a uniform consistency of soft ice cream. The emulsion was allowed to stand in a closed container for four days. After this period, the emulsion had the same consistency and there was no separation of a supernatant liquid.

Example 41 illustrated the accommodation of further amounts of organic solvent present in the solution of the phenoxy resin as well that present in the lithium stearate slurry. Lithium stearate acted as a surfactant which furthered the ability of the emulsion to contain both the phenoxy resin additive as well as the organic solvents in homogeneity.

EXAMPLES 42–43

Two size coating emulsions were made using the following compositions:

| Components: | Example 42 | Example 43 |
| --- | --- | --- |
| water | 25.55 | 24.47 |
| An emulsifiable ketoxime-blocked polyurethane prepolymer[1] | 20.02 | 16.30 |
| 35% solution of methylenedianiline in ethoxyethanol acetate | 6.86 | — |
| 25% solution of "UCAR" Phenoxy PKHH phenoxy resin in ethoxyethanol acetate | 24.44 | 20.64 |
| diethyl toluene diamine | | 1.86 |
| lithium stearate solid | 1.12 | 0.91 |
| white filler[2] | 1.12 | 0.91 |

[1]derived from the reactants and procedures of Examples 1–2 of Chin et al., U.S. Pat. No. 4,835,210
[2]known under the trade designation "Beaver White", from Luzenac America, Inc., Englewood, Colorado.

The emulsions produced in Examples 42 and 43 were applied as size coatings on mineral coated web as described in the Comparative Example A. The emulsions from Examples 42 and 43 each replaced the organic solvent-based size coating prepared from "Adiprene L-315", methylene dianiline, and "UCAR" Phenoxy PKHH phenoxy resin. The size coated webs were partially dried as described before and wheels for smear testing were prepared as described.

| Wheel Example | Smear Rating |
| --- | --- |
| Comparative Example A | 3–4 |
| Wheel from example 42 size coating | 3–4 |
| Wheel from example 43 size coating | 3–4 |

The smear rating data illustrated the ability to accommodate an inherently organic solvent-soluble smear-reducing additive (such as a phenoxy resin) in a substantially aqueous coating composition with the use of additional emulsifier such as the lithium stearate soap which also acted as a lubricant in the size coating. The total organic solvent emissions from the use of size coating from example 43 would be 24% of the composition, while the mixture of Comparative Example A would yield 45% of the composition as emissions from the curing and pressing process for making nonwoven abrasive articles of various sizes and thicknesses.

Various modifications and alterations of this invention will become apparent to those skilled in the art without departing from the scope of the invention, and it should be understood that this invention is not to be unduly limited to the illustrated embodiments set forth herein.

What is claimed is:

1. A surface treating article comprising an organic matrix substantially engulfed by a binder, the binder comprising:

a reaction product of an aqueous binder precursor emulsion comprising a plurality of linear isocyanate-terminated polyurethane prepolymers and an amine-functional material having an average amine functionality of at least 2, the emulsion further including an ingredient selected from the group consisting of
i) a sufficient amount of a thickening agent; and
ii) a combination of a compatible smear-reducing additive, an organic solvent, and a surfactant.

2. An article in accordance with claim 1 wherein said article further comprises a plurality of abrasive particles dispersed and adhered within said binder.

3. An article in accordance with claim 1 wherein said linear isocyanate-terminated polyurethane prepolymer is blocked with a blocking agent.

4. An article in accordance with claim 3 wherein said linear isocyanate-terminated polyurethane prepolymer comprises the reaction product of a ketoxime-blocked hexamethylenediisocyanate with a polyol.

5. An article in accordance with claim 3 wherein said linear isocyanate-terminated polyurethane prepolymer comprises prepolymers selected from the group consisting of ketoxime blocked polyurethane prepolymers within the general formula

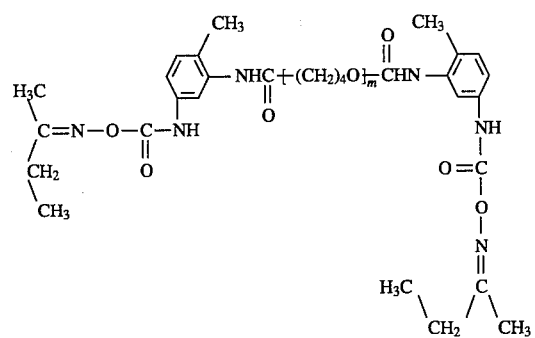

wherein m ranges from about 20 to about 50.

6. An article in accordance with claim 1 wherein said amine-functional material comprises a diamine.

7. An article in accordance with claim 6 wherein said diamine comprises isophorone diamine.

8. An article in accordance with claim 6 wherein said diamine comprises 4,4'-diaminodicyclohexylmethane.

9. An article in accordance with claim 1 wherein said amine-functional material comprises amine-functional poly(oxyalkylene) compounds selected from the group consisting of compounds within general formulas I, II, III, and IV:

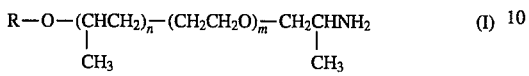  (I)

wherein R is an alkyl group having 1 to 4 carbon atoms and n and m are integers ranging from 0 to 20;

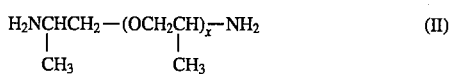  (II)

wherein x is an integer ranging from about 2 to about 20;

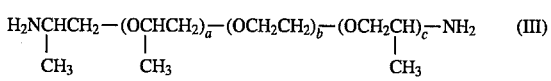  (III)

wherein a, b, and c are integers, the sum of a plus c ranges from 1 to 5, and b ranges from 0 to 20; and

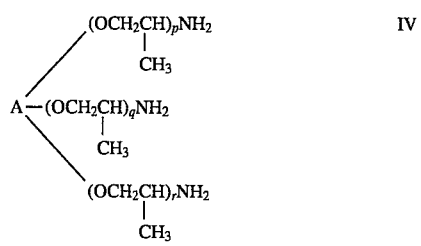  IV wherein p, q, and r are integers greater than zero such that the sum of p, q and r ranges from about 5 to about 30, and wherein A is a triol initiator.

10. An article in accordance with claim 6 wherein said diamine comprises an aromatic diamine.

11. An article in accordance with claim 10 wherein said aromatic diamine is selected from the group consisting of methylenedianiline and diethyltoluenediamine.

12. An article in accordance with claim 1 wherein said organic matrix comprises a nonwoven web of organic polymeric fibers.

13. An article in accordance with claim 12 wherein a major portion of said organic polymeric fibers are hydrophilic.

14. An article in accordance with claim 12 wherein said organic polymeric fibers are entangled.

15. An article comprising a plurality of the surface treating article of claim 1 attached to a hub.

16. An article in accordance with claim 14, said article wound spirally about itself under tension.

17. An article in accordance with claim 16 attached to a back-up plate.

18. A surface treating article comprising an open, lofty, three-dimensional nonwoven web comprised of a plurality of organic polymeric fibers, at least a portion of said fibers bound together at points where they contact by a first binder, the first binder comprising:

a reaction product of an aqueous binder precursor emulsion comprising a plurality of linear isocyanate-terminated polyurethane prepolymers and an amine-functional material having an average amine functionality of at least 2, the emulsion further including an ingredient selected from the group consisting of i) a sufficient amount of a thickening agent; and
ii) a combination of a compatible smear-reducing additive, an organic solvent, and a surfactant.

19. An article in accordance with claim 18 comprising a plurality of abrasive particles adhered to the fibers and the first binder by a second binder.

20. An article in accordance with claim 19 comprising a third binder coated over the second binder, said third binder comprising the material of claim 18.

21. An article in accordance with claim 18 wherein at least a portion of said plurality of organic polymeric fibers are entangled.

22. An article in accordance with claim 18 comprising a belt having first and second ends.

23. An article in accordance with claim 18 comprising an endless belt having first and second major surfaces.

24. An article in accordance with claim 23 having a reinforcement layer adhered to one of said first and second major surfaces.

25. An article in accordance with claim 23 having a reinforcement layer within said web of fibers.

26. An article in accordance with claim 18 having first and second ends, one of said ends attached to a hub.

27. An article in accordance with claim 18 wherein said linear isocyanate-terminated polyurethane prepolymer is blocked with a blocking agent.

28. An article in accordance with claim 27 wherein said linear isocyanate-terminated polyurethane prepolymer comprises the reaction product of a ketoxime-blocked hexamethylenediisocyanate with a polyol.

29. An article in accordance with claim 27 wherein said linear isocyanate-terminated polyurethane prepolymer comprises prepolymers selected from the group consisting of ketoxime blocked polyurethane prepolymers within the general formula

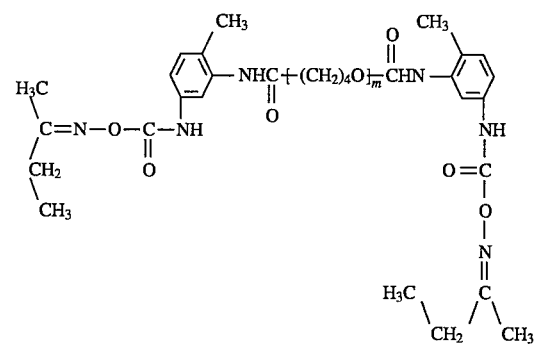

wherein m ranges from about 20 to about 50.

30. An article in accordance with claim 18 wherein said amine-functional material comprises a diamine.

31. An article in accordance with claim 30 wherein said diamine comprises isophorone diamine.

32. An article in accordance with claim 30 wherein said diamine comprises 4,4'-diaminodicyclohexylmethane.

33. An article in accordance with claim 18 wherein said amine-functional material comprises amine-functional poly(oxyalkylene) compounds selected from the group consisting of compounds within general formulas I, II, III, and IV:

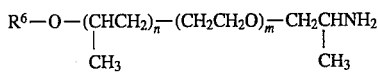 (I)

wherein R⁶ is an alkyl group having 1 to 4 carbon atoms and n and m are integers ranging from 0 to 20;

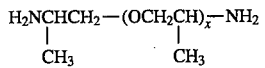 (II)

wherein x is an integer ranging from about 2 to about 20;

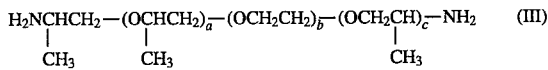 (III)

wherein a, b, and c are integers, the sum of a plus c ranges from 1 to 5, and b ranges from 0 to 20; and

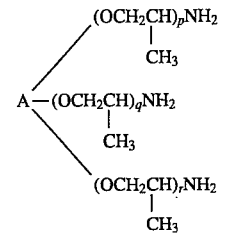 IV wherein p, q, and r are integers greater than zero such that the sum of p, q, and r ranges from about 5 to about 30, and wherein A is a triol initiator.

34. An article in accordance with claim 30 herein said diamine comprises an aromatic diamine.

35. An article in accordance with claim 34 wherein said aromatic diamine is selected from methylenedianiline, diethyltoluenediamine, and combinations thereof.

* * * * *